US012400847B2

(12) United States Patent
Endo et al.

(10) Patent No.: US 12,400,847 B2
(45) Date of Patent: Aug. 26, 2025

(54) ION DETECTOR, MEASUREMENT DEVICE, AND MASS SPECTROMETER

(71) Applicant: HAMAMATSU PHOTONICS K.K., Hamamatsu (JP)

(72) Inventors: Takeshi Endo, Hamamatsu (JP); Hiroshi Kobayashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 562 days.

(21) Appl. No.: 17/621,821

(22) PCT Filed: Dec. 6, 2019

(86) PCT No.: PCT/JP2019/047965
§ 371 (c)(1),
(2) Date: Dec. 22, 2021

(87) PCT Pub. No.: WO2021/024505
PCT Pub. Date: Feb. 11, 2021

(65) Prior Publication Data

US 2022/0246417 A1 Aug. 4, 2022

(30) Foreign Application Priority Data

Aug. 2, 2019 (JP) ................................ 2019-143036

(51) Int. Cl.
*H01J 49/06* (2006.01)
*H01J 49/02* (2006.01)

(52) U.S. Cl.
CPC ............ *H01J 49/06* (2013.01); *H01J 49/025* (2013.01)

(58) Field of Classification Search
None
See application file for complete search history.

(56) References Cited

U.S. PATENT DOCUMENTS 5,068,535 A * 11/1991 Rabalais ............... H01J 49/446 850/16
2004/0061054 A1 4/2004 Kondo et al.
(Continued)

FOREIGN PATENT DOCUMENTS

CN 102668017 A 9/2012
CN 103518249 A 1/2014
(Continued)

OTHER PUBLICATIONS

International Preliminary Report on Patentability mailed Feb. 17, 2022 for PCT/JP2019/047965.

*Primary Examiner* — Andrew Smyth
(74) *Attorney, Agent, or Firm* — Faegre Drinker Biddle & Reath LLP

(57) ABSTRACT

The present embodiment relates to an ion detector and the like that can reduce a dark current serving as a noise component. An ion detector having an electron multiplier includes a shield structure confining a potential gradient spreading in all directions starting from an input electrode into a limited space including the input electrode, and an input cable having one end electrically connected to the input electrode. The shield structure has a structure surrounding at least the input electrode, and includes one or more members. Each of the members is comprised of a metal material or an insulating material. Further, a part of the shield structure is constituted by a metal mesh window. An outer peripheral surface of the input cable is covered with an insulating coating in order to block the arrival of unnecessary ions and electrons generated inside and outside the shield structure.

12 Claims, 13 Drawing Sheets

(56) References Cited

U.S. PATENT DOCUMENTS

| | | | | |
|---|---|---|---|---|
| 2006/0011826 | A1* | 1/2006 | Scheidemann | H01J 49/025 250/281 |
| 2008/0230686 | A1 | 9/2008 | Suzuki et al. | |
| 2008/0290267 | A1 | 11/2008 | Hayashi et al. | |
| 2011/0186727 | A1* | 8/2011 | Loboda | H01J 49/40 250/282 |

FOREIGN PATENT DOCUMENTS

| | | | | | |
|---|---|---|---|---|---|
| CN | 103646845 | A | | 3/2014 | |
| CN | 103730324 | A | | 4/2014 | |
| CN | 105826159 | A | | 8/2016 | |
| EP | 0932184 | B1 | * | 5/2011 | |
| JP | H2-075533 | U | | 6/1990 | |
| JP | H05-080157 | A | | 4/1993 | |
| JP | H5-325878 | A | | 12/1993 | |
| JP | H10-241622 | A | | 9/1998 | |
| JP | 2001-351565 | A | | 12/2001 | |
| JP | 2002-203508 | A | | 7/2002 | |
| JP | 2007-527601 | A | | 9/2007 | |
| JP | 2009-080124 | A | | 4/2009 | |
| JP | 2009-289600 | A | | 12/2009 | |
| JP | 2010-067613 | A | | 3/2010 | |
| JP | 2011-181336 | A | | 9/2011 | |
| JP | 2014-078501 | A | | 5/2014 | |
| JP | 2014-078502 | A | | 5/2014 | |
| JP | 2014078504 | A | * | 5/2014 | G01T 1/00 |
| JP | 2017-037782 | A | | 2/2017 | |
| WO | WO-2005/088672 | A2 | | 9/2005 | |
| WO | WO 2007/099958 | A1 | | 9/2007 | |
| WO | WO 2014/014742 | A1 | | 1/2014 | |

* cited by examiner

ION DETECTOR, MEASUREMENT DEVICE, AND MASS SPECTROMETER

TECHNICAL FIELD

The present invention relates to an ion detector, a measuring device, and a mass spectrometer.

BACKGROUND ART

An ion detector having an electron multiplier that emits electrons in response to incidence of charged particles is used in various technical fields. For example, an ion detector having an electron multiplier can be used in a measuring device such as a mass spectrometer (mass spectrometry), and operates in a housing maintained in a high vacuum state (less than 0.1 Pa). As such an ion detector, for example, detectors disclosed in Patent Documents 1 to 3 are known.

CITATION LIST

Patent Literature

Patent Document 1: Japanese Patent Application Laid-Open No. 2011-181336
Patent Document 2: Japanese Patent Application Laid-Open No. 2009-289600
Patent Document 3: Japanese Patent Application Laid-Open No. H5-80157

SUMMARY OF INVENTION

Technical Problem

As a result of studying the above-described conventional techniques, the inventors have found the following problems. That is, in such mass spectrometry as described above, bipolar ions (charged particles) can be detected, but a conventional ion detector cannot obtain sufficient detection accuracy unless it is in a housing maintained in a high vacuum state. That is, in recent years, ion detection in a low vacuum state (0.1 Pa or more) has been desired in order to downsize a device and reduce the cost of the device, but it is currently difficult to maintain detection accuracy in a low vacuum state.

The main cause of the difficulty in maintaining the detection accuracy is the presence of unnecessary gas remaining in the housing in the low vacuum state. In the ion detector operating in the housing, a voltage (either positive or negative) having a large absolute value is applied to an input-side electrode disposed on the input unit side of the electron multiplier. When the positive or negative voltage is applied to the input-side electrode, a rapid potential gradient spreads from the input-side electrode toward the inner wall of the housing set to the ground potential. On the other hand, electrons are emitted from a portion having a relatively negative potential to a region around the portion, and the emitted electrons collide with unnecessary residual gas molecules to generate ions. Generally, the electron mean free path is 25 mm at a degree of vacuum of 1 Pa, 5 mm at a degree of vacuum of 5 Pa, and 2.5 mm at a degree of vacuum of 10 Pa. When the unnecessary ions generated by such a mechanism are accelerated by the above-described potential gradient and are incident on the input unit of the electron multiplier, new electrons are emitted and a dark current serving as a noise component is generated.

In the ion detector of Patent Document 1, a mesh electrode is disposed on the input unit side of an electron multiplier, but there is no structure that blocks a potential gradient formed by an input-side electrode. In addition, there is no coating of a wiring for setting each electrode to an arbitrary potential. Therefore, in the ion detector of Patent Document 1, it is not possible to suppress unnecessary ions generated by discharge between a housing and a high-voltage unit, to block the arrival of unnecessary ions at the electron multiplier and an anode, and to prevent discharge of the wiring. In addition, also in each of the ion detectors of Patent Documents 2 and 3, an electrode portion and a wiring portion to which a voltage having a large absolute value is applied are exposed, and it is not possible to prevent the generation of unnecessary ions and arrival of unnecessary ions at an electron multiplier, an anode, and the like.

The present invention has been made to solve the above-described problems, and an object of the present invention is to provide an ion detector having a structure for effectively suppressing the generation of a dark current serving as a noise component, a measuring device including the ion detector, and a mass spectrometer including the ion detector.

Solution to Problem

An ion detector according to the present embodiment is a detector that operates in a housing in a depressurized state, and includes an electron multiplier, an input-side electrode, an output-side electrode, a shield structure, a mesh window, a high-voltage cable, and an insulating coating that covers an outer peripheral surface of the high-voltage cable. The electron multiplier emits electrons in response to incidence of charged particles. In addition, the electron multiplier includes an input unit that the charged particles reach and an output unit that emits the electrons. At least a part of the input-side electrode is provided in the input unit of the electron multiplier. At least a part of the output-side electrode is provided in the output unit of the electron multiplier. The shield structure has a structure surrounding at least the input-side electrode in order to confine a potential gradient spreading in all directions starting from the input-side electrode into a limited space including the input-side electrode. In addition, the shield structure includes one or more members. Each of the one or more members is comprised of a metal material or an insulating material (including glass, ceramic, resin, or the like). The mesh window constitutes a part of the shield structure as a member comprised of the metal material. The mesh window is disposed so as to directly face the input unit of the electron multiplier while being separated by a predetermined distance without being obstructed by a structural element (for example, a part of the metal member or a part of the insulating member) that deforms the potential gradient. The high-voltage cable having the outer peripheral surface covered with the insulating coating includes at least an input-side cable having one end electrically connected to the input-side electrode. In order to apply a high voltage to the input unit and/or the output unit, a cable connected to each electrode is disposed by being introduced from the outside to the inside of the housing (and is held in the housing while penetrating the housing). In addition, the insulating coating is provided on an outer peripheral surface of the input-side cable, has a coating structure extending along the longitudinal direction of the input-side cable, and includes a portion extending from an inner wall of the housing toward the input-side electrode, in order to limit the movement of unnecessary ions that may be generated inside and outside the shield structure.

Note that each embodiment according to the present invention can be more sufficiently understood from the following detailed description and the accompanying drawings. These examples are given by way of illustration only and should not be considered as limiting the invention.

The scope of further application of the present invention will be apparent from the following detailed description. However, the detailed description and specific cases, while indicating preferred embodiments of the present invention, are illustrated for illustrative purposes only, and it is apparent that various modifications and improvements within the scope of the present invention will be obvious to those skilled in the art from this detailed description.

Advantageous Effects of Invention

An ion detector according to the present embodiment includes a shield structure that confines a potential gradient spreading in all directions starting from an input-side electrode into a limited space including the input-side electrode in a housing in a depressurized state, and a block structure that limits the movement of unnecessary ions. With this configuration, it is possible to suppress the generation of unnecessary ions due to discharge between the housing and a high-voltage unit (for example, the input-side electrode, an output-side electrode, a high-voltage cable, and the like) of the ion detector. In addition, even when unnecessary ions are generated in the housing, the unnecessary ions are not accelerated toward an electron multiplier. That is, the shield structure or the like cancels an environment (potential gradient formed by the input-side electrode) in which unnecessary ions are generated and are incident on the electron multiplier such that the generation of a dark current serving as a noise component is effectively suppressed.

DESCRIPTION OF EMBODIMENTS

Description of Embodiments of Present Invention

Figure 1:
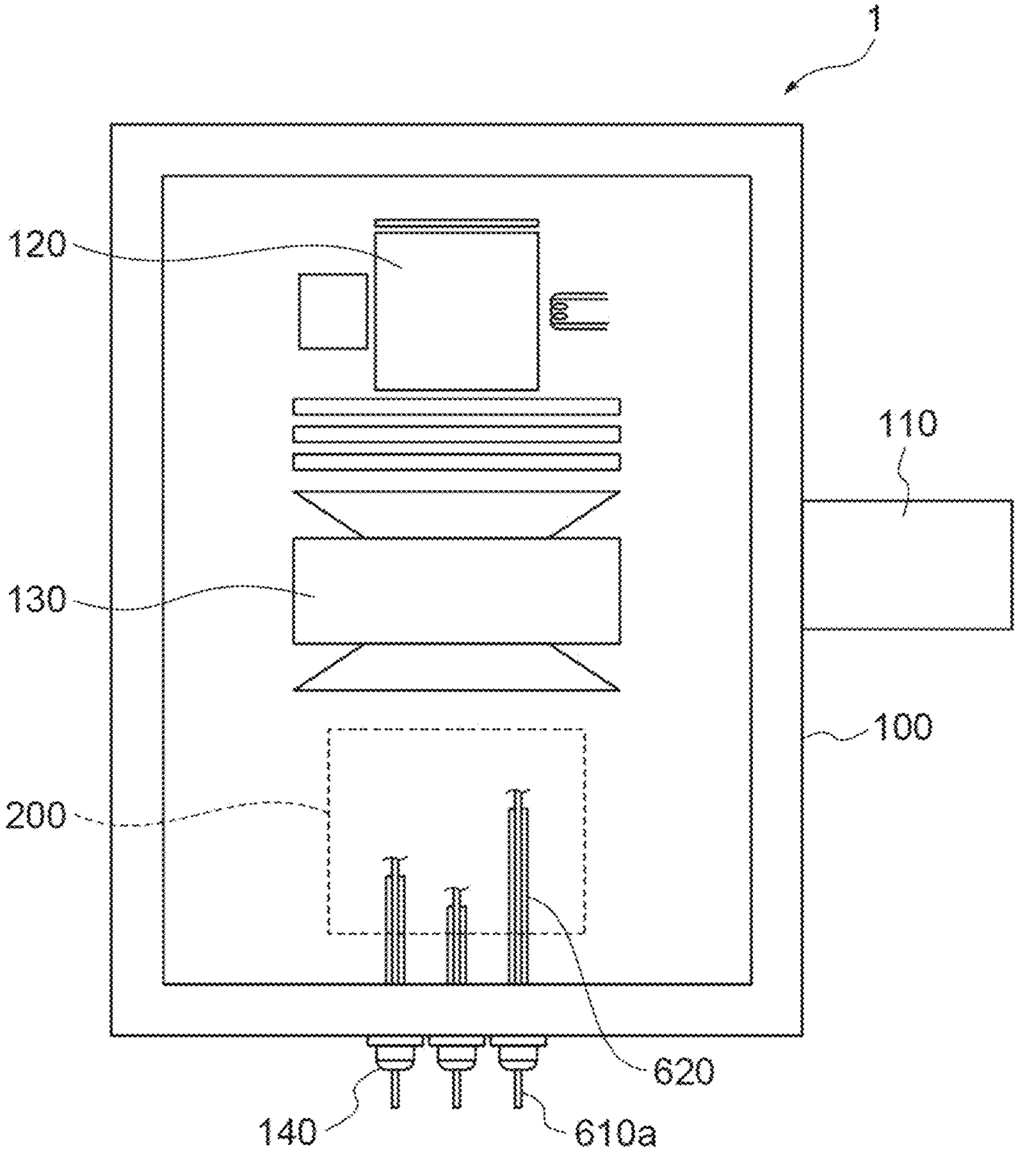
FIG. 1 is a diagram illustrating a typical structure of a mass spectrometer as an example of a measuring device in which an ion detector according to the present embodiment can be used.

First, the contents of an embodiment of the present invention will be individually listed and described.

(1) As one aspect of the present embodiment, an ion detector according to the present embodiment operates in a housing in a depressurized state, and includes at least an electron multiplier, an input-side electrode, an output-side electrode, a shield structure, a mesh window, a high-voltage cable, and a first insulating coating that covers an outer peripheral surface of the high-voltage cable. The electron multiplier emits electrons in response to incidence of charged particles. In addition, the electron multiplier includes an input unit that the charged particles reach and an output unit that emits the electrons. At least a part of the input-side electrode is provided in the input unit of the electron multiplier. At least a part of the output-side electrode is provided in the output unit of the electron multiplier. The shield structure has a structure surrounding at least the input-side electrode in order to confine a potential gradient spreading in all directions starting from the input-side electrode into a limited space including the input-side electrode. In addition, the shield structure includes one or more members. Each of the one or more members is comprised of a metal material or an insulating material (including glass, ceramic, resin, or the like). The mesh window constitutes a part of the shield structure as a member comprised of the metal material. The mesh window is disposed so as to directly face the input unit of the electron multiplier while being separated by a predetermined distance without being obstructed by a structural element (for example, a part of the metal member or a part of the insulating member) that deforms the potential gradient. Therefore, in a space between the input unit of the electron multiplier and the mesh window, there is no obstacle such as a metal member or an insulator except for a part of the input-side electrode. Note that the shield structure having the mesh window enables a function of suppressing the generation of unnecessary ions in the housing and limiting the movement of the unnecessary ions.

In the ion detector, the high-voltage cable having the outer peripheral surface covered with the first insulating coating includes at least an input-side cable having one end electrically connected to the input-side electrode. In order to apply a high voltage to the input unit and/or the output unit, a cable connected to each electrode is disposed by being introduced from the outside to the inside of the housing (and is held in the housing while penetrating the housing). In addition, the first insulating coating has a coating structure provided on an outer peripheral surface of the input-side cable and extending along the longitudinal direction of the input-side cable in order to limit the movement of unnecessary ions (such unnecessary ions and electrons can be triggers of discharge) that may be generated inside and outside the shield structure. The first insulating coating includes a portion extending from an inner wall of the housing as a starting point toward the input-side electrode. For example, in a case where a part of the above-described shield structure is constituted by a part of the housing that houses the ion detector, the length (length along the longitudinal direction of the input-side cable) of the portion extending from the inner wall of the housing toward the input-side electrode is preferably ½ or more of the shortest distance between the inner wall of the housing and the input-side electrode.

(2) As one aspect of the present embodiment, the shield structure may be disposed in the housing while being physically separated from the housing. In this case, the portion (portion extending from the inner wall of the housing toward the input-side electrode) of the first insulating coating preferably covers at least an entire exposed region present on the outer peripheral surface of the input-side cable and extending from the inner wall of the housing to the shield structure. Furthermore, as one aspect of the present embodiment, the first insulating coating is preferably comprised of a resin material such as Teflon (registered trademark), an epoxy resin, or a polyimide resin.

(3) As one aspect of the present embodiment, the shield structure may include an input-side shield portion surrounding the input-side electrode and an output-side shield portion physically separated from the input-side shield portion and surrounding the output-side electrode. On the other hand, as one aspect of the present embodiment, the shield structure may have a structure surrounding both the input-side electrode and the output-side electrode. Furthermore, as one aspect of the present embodiment, the shield structure may include a separator comprised of an insulating material and disposed between the input-side electrode and the output-side electrode. In each of the structures, it is possible to effectively suppress the generation of a dark current.

(4) As one aspect of the present embodiment, the input-side electrode may function as the input unit of the electron multiplier. In addition, the output-side electrode may function as the output unit of the electron multiplier. In this case, the electron multiplier is constituted by a dynode unit having dynodes and anodes at a plurality of stages and can be used in the ion detector according to the present embodiment. In the present aspect, the dynode (electrode) at the first stage functions as the input unit, and the dynode (electrode) that supplies electrons to the anode positioned at the last stage functions as the output unit.

(5) As one aspect of the present embodiment, the ion detector may further include an output-side cable for setting the potential of the output-side electrode, the output-side cable penetrating the housing and having one end electrically connected to the output-side electrode, and a second insulating coating provided on an outer peripheral surface of the output-side cable and extending along the longitudinal direction of the output-side cable. Similarly to the first insulating coating described above, the second insulating coating provided on the outer peripheral surface of the output-side cable also includes a portion extending from the inner wall of the housing as a starting point toward the output-side electrode. The length (length along the longitudinal direction of the output-side cable) of the portion (portion extending from the inner wall of the housing toward the output-side electrode) of the second insulating coating is also preferably ½ or more of the shortest distance between the inner wall of the housing and the output-side electrode. In the configuration in which the shield structure is disposed in the housing while being physically separated from the housing, the portion (portion extending from the inner wall of the housing toward the output-side electrode) of the second insulating coating preferably covers at least an entire exposed region present on the outer peripheral surface of the output-side cable and extending from the inner wall of the housing to the shield structure. Furthermore, as one aspect of the present embodiment, the second insulating coating is also preferably comprised of a resin material such as Teflon, an epoxy resin, or a polyimide resin, similarly to the above-described first insulating coating.

(6) As one aspect of the present embodiment, the mesh window is preferably set to the ground potential. In the present specification, the "ground potential" means a potential in a range of −500V to +500V. In addition, in the present specification, "voltage" and "potential difference" mean absolute values unless otherwise indicated. Furthermore, as one aspect of the present embodiment, it is preferable that a specific member among the members included in the shield structure and comprised of the metal material is disposed such that the shortest distance from the input-side electrode to the specific member is 1 cm or less.

(7) The ion detector having the above-described structure can be used in various devices. For example, as one aspect of the present embodiment, a measuring device according to the present embodiment includes the ion detector (ion detector according to the present embodiment) having the above-described structure, and a housing that houses at least the ion detector. The housing includes one or more members, and each of the one or more members is comprised of a metal material or an insulating material. In addition, at least a part of the above-described shield structure may be constituted by the housing. Furthermore, the above-described shield structure may be disposed in the housing in a state where the shield structure is completely or partially independent of a unit (ion detection unit) that enables an ion detection function (the mesh window constitutes a part of the shield structure).

(8) Specifically, as one aspect of the present embodiment, the ion detector according to the present embodiment can be used in a mass spectrometer. Specifically, the mass spectrometer includes an ionization unit, a separation unit, the ion detector according to the present embodiment, and a housing. The ionization unit ionizes a sample and releases generated ions in an accelerated state. The separation unit separates specific ions among the ions released from the ionization unit. The ion detector detects the specific ions separated by the separation unit, and is disposed such that a mesh window is positioned between the separation unit and the input-side electrode. In addition, the housing may constitute at least a part of the above-described shield structure, houses at least the ionization unit, the separation unit, and the ion detector, and is set to the ground potential (in a range from −500V to +500V). Note that the above-described shield structure may be disposed in the housing in a state where the shield structure is completely or partially independent of the unit (ion detection unit) that enables the ion detection function (the mesh window constitutes a part of the shield structure).

As described above, each aspect listed in the section of Description of Embodiments of Present Invention is applicable to each of all the remaining aspects or to all combinations of these remaining aspects.

Details of Embodiments of Present Invention

Specific examples of an ion detector and the like according to the present invention will be described in detail below with reference to the accompanying drawings. Note that the present invention is not limited to these examples, but is indicated by the claims, and is intended to include all modifications within the meaning and scope equivalent to the claims. In the description of the drawings, the same elements are denoted by the same reference numerals, and redundant description is omitted.

FIG. 1 is a diagram illustrating a typical structure of a mass spectrometer as an example of a measuring device in which the ion detector according to the present embodiment can be used. A mass spectrometer 1 illustrated in FIG. 1 includes a housing 100 (vacuum chamber), a vacuum pump 110 for maintaining the inside of the housing 100 in a constant vacuum state, an ionization unit 120, a separation unit 130, and an ion detector 200. In addition, a plurality of terminals 140 for voltage application and signal outputted to the ion detector 200 is arranged in the housing 100. The plurality of terminals 140 includes an input-side cable 610*a* connected to an input-side electrode of the ion detector 200, and an outer peripheral surface of the input-side cable 610*a* is covered with a resin coating (insulating coating) 620 inside and outside the ion detector 200. In the example of FIG. 1, outer peripheral surfaces of other cables included in the plurality of terminals 140 are also covered with a resin coating (insulating coating). In the configuration in which the electrode of the ion detector 200 and a high-voltage unit such as a high-voltage cable including the input-side cable 610*a* are directly exposed to an inner wall of the housing 100, there is a high possibility that unnecessary ions are generated by discharge between the high-voltage unit and the inner wall of the housing 100. In addition, unnecessary ions and electrons generated in this manner can be a trigger for discharge. Therefore, the resin coating 620 functions to prevent such unnecessary ions and electrons from reaching the high-voltage unit side, particularly the high-voltage cable.

The housing 100 is set to the ground potential. The internal space of the housing 100 can be adjusted to both a high vacuum state and a low vacuum state. The ionization unit 120 ionizes a sample and releases generated ions in an accelerated state. The separation unit 130 separates specific ions among the ions released from the ionization unit 120 (an ion trap is illustrated in FIG. 1). The ion detector 200 is a detector that detects the specific ions separated by the separation unit 130.

Figure 2:
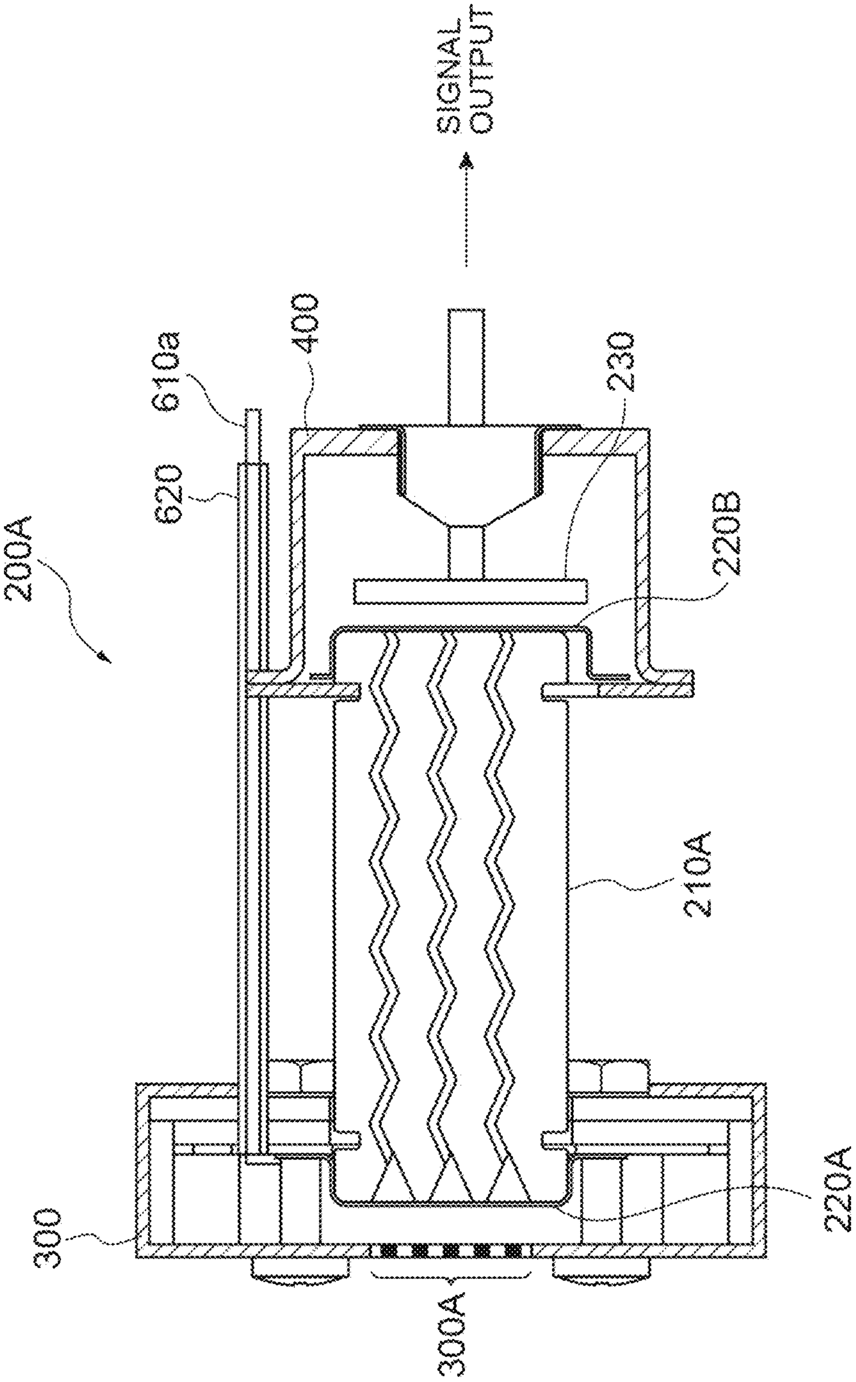
FIG. 2 is a diagram illustrating a first configuration example of the ion detector according to the present embodiment.

FIG. 2 illustrates a first configuration example of the ion detector according to the present embodiment. That is, the first configuration example illustrated in FIG. 2 is an ion detector 200A that is configured to detect cations and includes a channel electron multiplier (CEM) 210A as an electron multiplier. Specifically, the ion detector 200A includes the CEM 210A, an input-side electrode 220A provided at an input unit of the CEM 210A, an output-side electrode 220B provided on an output side of the CEM 210A, an anode 230, a shield structure for blocking the spread of a potential gradient formed by the input-side electrode 220A, and a voltage application structure (high-voltage cable or the like) to each electrode. At least a part of the input-side electrode 220A is in contact with the input unit of the CEM 210A, and the input-side electrode 220A sets the input unit to a predetermined potential via the input-side cable 610*a*. In the example of FIG. 2, the outer peripheral surface of the input-side cable 610*a* is covered with the resin coating 620 for preventing elements (unnecessary ions and electrons), which can trigger discharge, from reaching this cable. At least a part of the output-side electrode 220B is in contact with the output unit of the CEM 210A, and the output-side electrode 220B sets the output unit to a predetermined potential (for example, the ground potential). The anode 230 is an electrode that captures electrons from the output unit of the CEM 210A, and is set to a predetermined potential via the cable 610*b* (see FIGS. 4A and 4B). The shield structure includes an input-side shield portion 300 and an output-side shield portion 400 physically separated from the input-side shield portion 300.

The input-side shield portion 300 is constituted by a metal cover that covers the input-side electrode 220A. However, the input-side shield portion 300 may be an insulating cover comprised of an insulating material, instead of the metal cover. In addition, the input-side shield portion 300 may be formed by combining a metal member and an insulating member. The input-side shield portion 300 may be formed by combining a metal member, an insulating member, and a part of the housing 100. Further, the input-side shield portion 300 has a mesh window 300A. No obstacle such as a metal member or an insulating member is disposed between the input unit of the CEM 210A and the mesh window 300A.

The output-side shield portion 400 is constituted by a metal cover. However, the output-side shield portion 400 may also be an insulating cover comprised of an insulating material, instead of the metal cover. In addition, the output-side shield portion 400 may be formed by combining a metal member and an insulating member. The output-side shield portion 400 may be formed by combining a metal member, an insulating member, and a part of the housing 100. Note that, in each of the input-side shield portion 300 and the output-side shield portion 400, when a part or the whole of the portion is constituted by a member comprised of an insulating material such as glass or ceramic, the member comprised of the insulating material functions to limit the movement of elements (unnecessary ions and electrons generated in the housing 100) that can be a trigger for discharge.

Figure 3A:
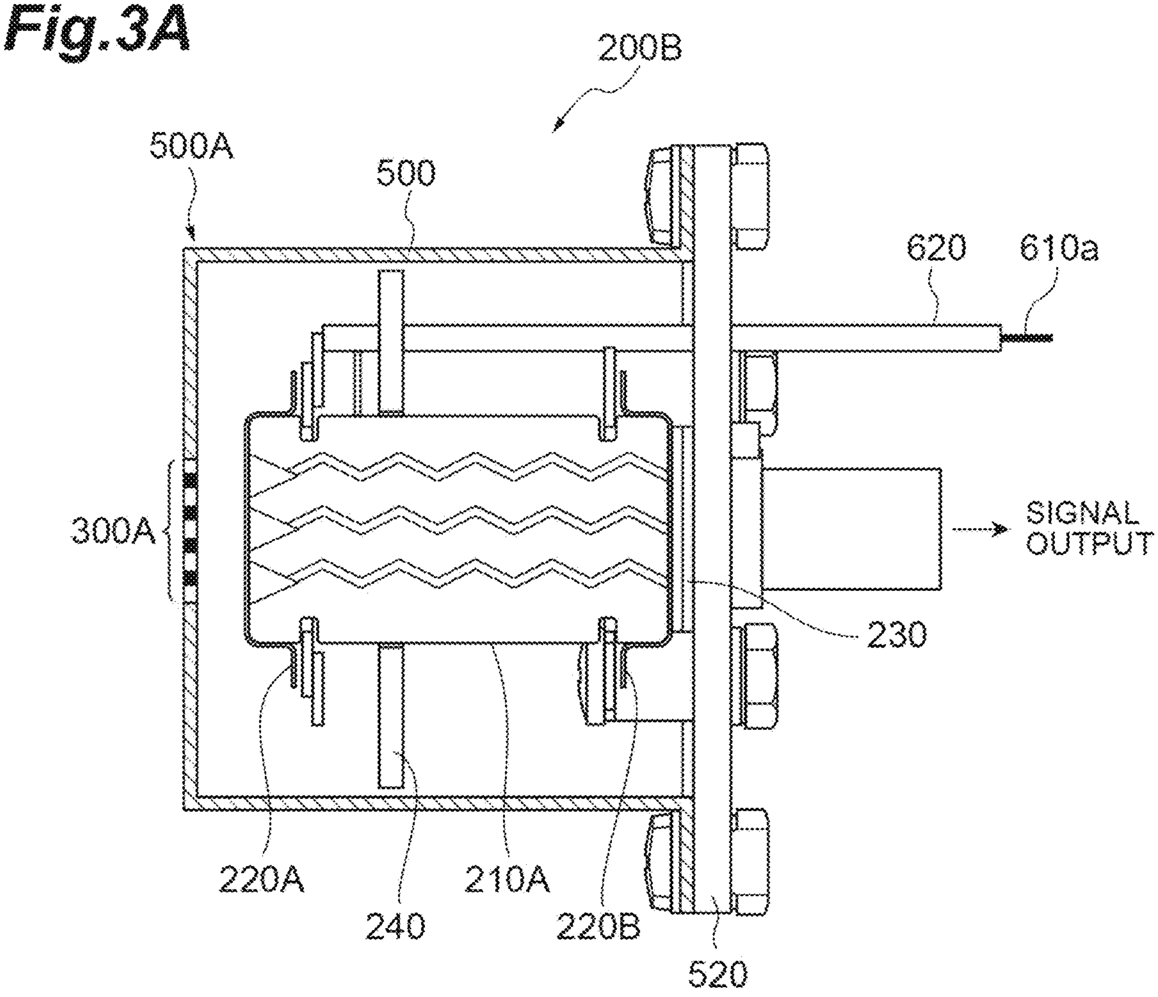
FIGS. 3A and 3B are diagrams illustrating second and third configuration examples of the ion detector according to the present embodiment.
Figure 3B:
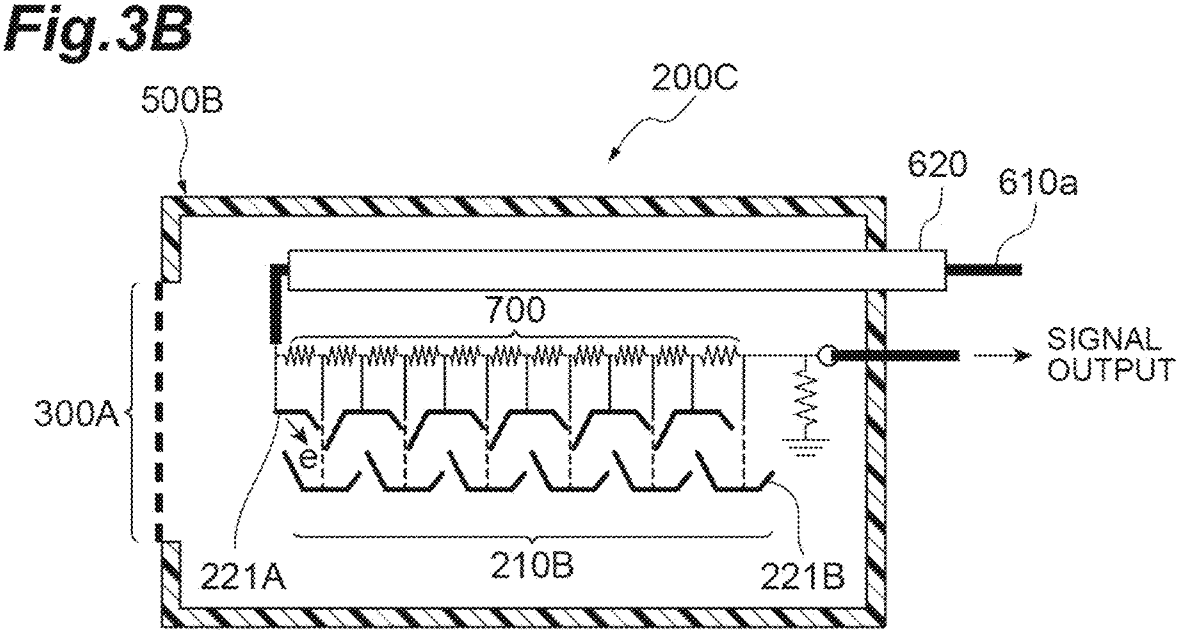

FIG. 3A is a diagram illustrating a second configuration example of the ion detector according to the present embodiment, and FIG. 3B is a diagram illustrating a third configuration example of the ion detector according to the present embodiment. The configuration of a main part of an ion detector 200B of the second configuration example illustrated in FIG. 3A is the same as that of the ion detector 200A illustrated in FIG. 2, except for a shield structure. In addition, an ion detector 200C of the third configuration example illustrated in FIG. 3B is different from the ion detectors 200A and 200B illustrated in FIGS. 2 and 3A in a material for implementing a shield structure and the configuration of an electron multiplier constituting a main part.

The ion detector 200B illustrated in FIG. 3A includes a CEM 210A, an input-side electrode 220A provided at an input unit of the CEM 210A, an output-side electrode 220B provided on an output side of the CEM 210A, a separator 240 comprised of an insulating material, an anode 230, and a shield structure 500A for blocking the spread of a potential gradient formed by the input-side electrode 220A. At least a part of the input-side electrode 220A is in contact with the input unit of the CEM 210A, and the input-side electrode 220A sets the input unit to a predetermined potential via the input-side cable 610*a*. In order to prevent unnecessary ions generated inside and outside the shield structure 500A from reaching the input-side cable 610*a*, the outer peripheral surface of the input-side cable 610*a* is covered with the resin coating 620, and the resin coating 620 extends from the inside of the shield structure 500A to the inner wall of the housing 100. At least a part of the output-side electrode 220B is in contact with the output unit of the CEM 210A, and the output-side electrode 220B sets the output unit to a predetermined potential (for example, the ground potential). The anode 230 is an electrode that captures electrons from the output unit of the CEM 210A, and is set to a predetermined potential via the cable 610*b* (see FIGS. 4A and 4B). The separator 240 is comprised of an insulating material such as glass, ceramic, or resin, and is disposed between the input-side electrode 220A and the output-side electrode 220B. Unlike the ion detector illustrated in FIG. 2, the shield structure 500A includes a metal cover 510 that houses both the input-side electrode 220A and the output-side electrode 220B, and a metal plate 520 that functions as a stein. The metal cover 510 has a mesh window 300A. Note that the shield structure 500A may be comprised of an insulating material, or may include a plurality of members each comprised of a metal material or an insulating material.

On the other hand, the ion detector 200C illustrated in FIG. 3B has a shield structure 500B comprised of an insulating material. Note that the shield structure 500B may also be comprised of a metal material, or may include a plurality of members each comprised of an insulating material or a metal material. As the electron multiplier, a dynode unit 210B having a plurality of dynodes (electrodes) is housed in the shield structure 500B. In the dynode unit 210B, a dynode 221A at the first stage functions as the input unit of the electron multiplier. An anode 221B is disposed at the last stage of the dynode unit 210B, and a dynode that supplies electrons to the anode 221B and is present at the previous stage functions as the output unit of the electron multiplier. The potential of each of the dynodes that are present at the plurality of stages and include the dynode 221A (input unit) at the first stage and the anode 221B is set by a divider circuit 700. In order to prevent unnecessary ions generated in the housing 100 from reaching the input-side cable 610*a*, the outer peripheral surface of the input-side cable 610*a* is covered with the resin coating 620. The divider circuit 700 may be fixed to the shield structure 500B by potting resin.

Figure 4A:
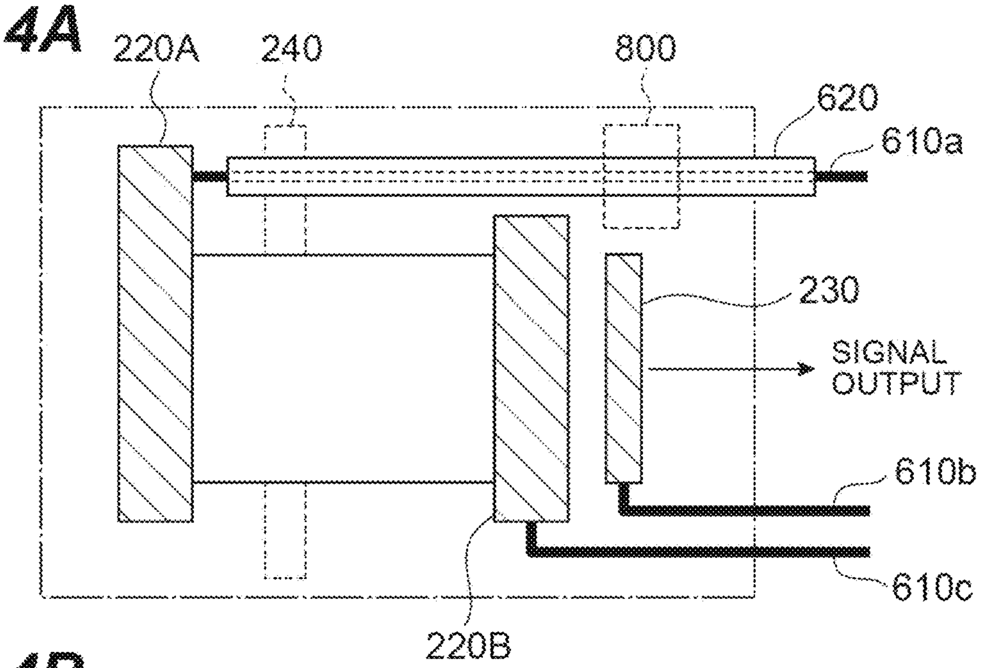
FIGS. 4A to 4C are conceptual diagrams in which internal structures of ion detectors 200A and 200B illustrated in FIGS. 2 and 3A are simplified by focusing on operation.
Figure 4B:
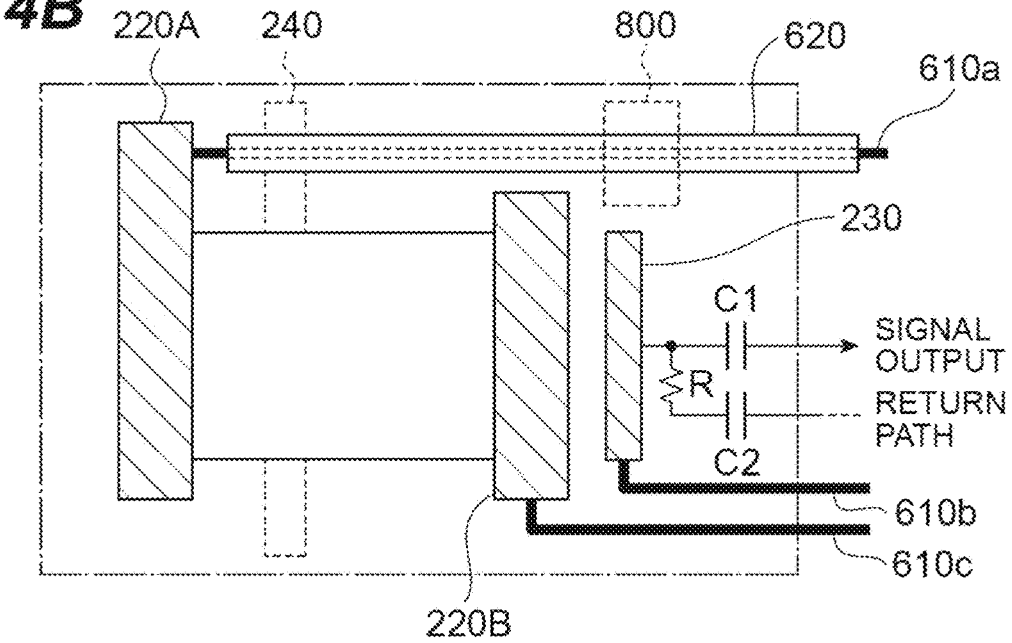
Figure 4C:
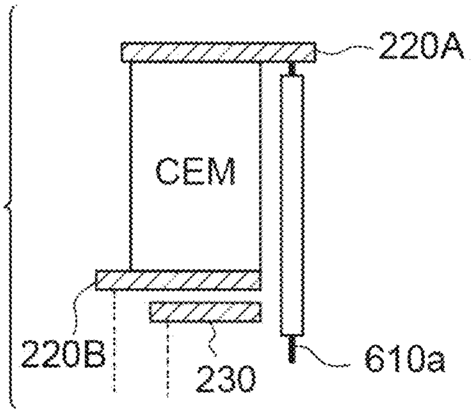

FIGS. 4A to 4C are conceptual diagrams in which the internal structures of the ion detectors 200A and 200B illustrated in FIGS. 2 and 3A are simplified by focusing on operation as samples of detector structures illustrated in the drawings referred to in the following description.

FIG. 4A is a conceptual diagram of the ion detector that detects cations and in which the main part illustrated in FIGS. 2 and 3A is simplified. The input-side electrode 220A is provided in the input unit of the electron multiplier (CEM), and the output-side electrode 220B is provided on the output side of the electron multiplier. The separator 240 comprised of the insulating material may be provided between the input-side electrode 220A and the output-side electrode 220B. Further, the input-side cable 610*a* is connected to the input-side electrode 220A, and an output-side cable 610*c* is connected to the output-side electrode 220B. The cable 610*b* is connected to the anode 230. In FIG. 4A, only the input-side cable 610*a* is covered with the resin coating 620 in order to prevent unnecessary ions from reaching the input-side cable 610*a*, but the other cables 610*b* and 610*c* may also be covered with the resin coating. In addition, a power supply 800 that supplies a voltage to the input-side electrode 220A via the input-side cable 610*a* may also be disposed so as to be housed in the shield structure.

FIG. 4B is a conceptual diagram in which a main part of a bipolar type ion detector capable of detecting bipolar ions is simplified. In this bipolar type ion detector, a capacitor C1 is disposed on a signal line extending from the anode 230. In addition, a capacitor C2 is disposed on a return path (line for noise removal) connected to the signal line via a resistor R. Other configurations are similar to those of the ion detector illustrated in FIG. 4A.

FIG. 4C is a diagram in which the configuration of the above-described ion detector (FIGS. 4A and 4B) is further simplified, and this simplified structure is used to represent various shield structures illustrated in FIGS. 9 to 11, 12A, 12B, and 13 described later.

Figure 5A:
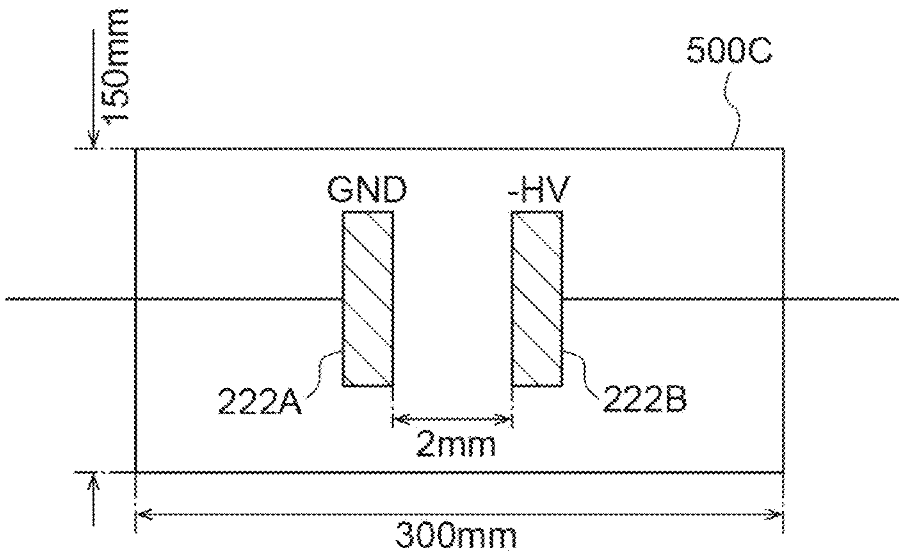
FIGS. 5A and 5B are graphs illustrating the relationship between pressure (degree of vacuum) in a vacuum chamber and a discharge voltage.
Figure 5B:
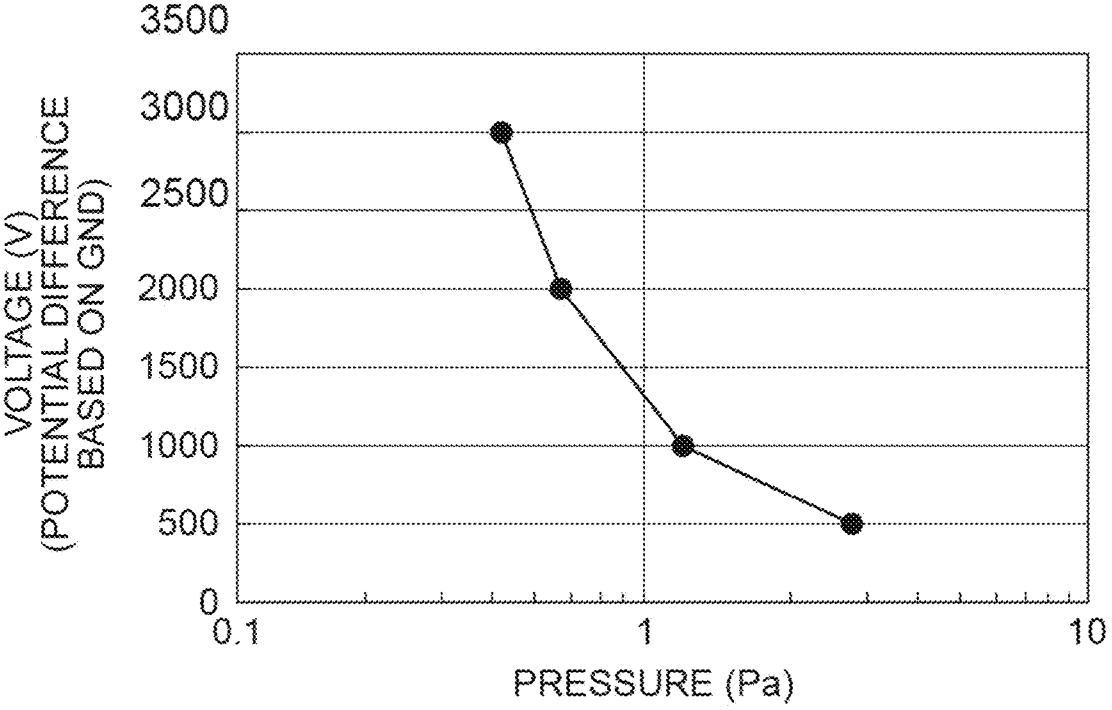

Next, the relationship between the degree of vacuum and the discharge will be described. FIG. 5A is a diagram illustrating a structure of an experimental apparatus prepared to explain the relationship between the pressure (degree of vacuum) in the vacuum chamber and the discharge voltage. FIG. 5B is a graph obtained by the apparatus illustrated in FIG. 5A. In FIG. 5B, the discharge voltage on the vertical axis is a potential difference (absolute value) based on GND (0V).

As illustrated in FIG. 5A, the experimental apparatus includes a cylindrical vacuum chamber 500C having a diameter of 150 mm and a length of 300 mm, and two electrodes 222A and 222B housed in the vacuum chamber 500C. The potential of the one electrode 222A is set to GND (0V), and the potential of the other electrode 222B is set to a negative potential (−HV). The distance between the two electrodes 222A and 222B is 2 mm Normally, the potential of the input-side electrode set for cation detection is −2 kV (absolute value 2 kV), but as can be seen from FIG. 5B, it is considered difficult to obtain a gain of about $10^6$ in a low vacuum state of 1 Pa or more. That is, it can be seen that the conventional ion detector cannot obtain sufficient detection accuracy in the low vacuum state.

Figure 6:
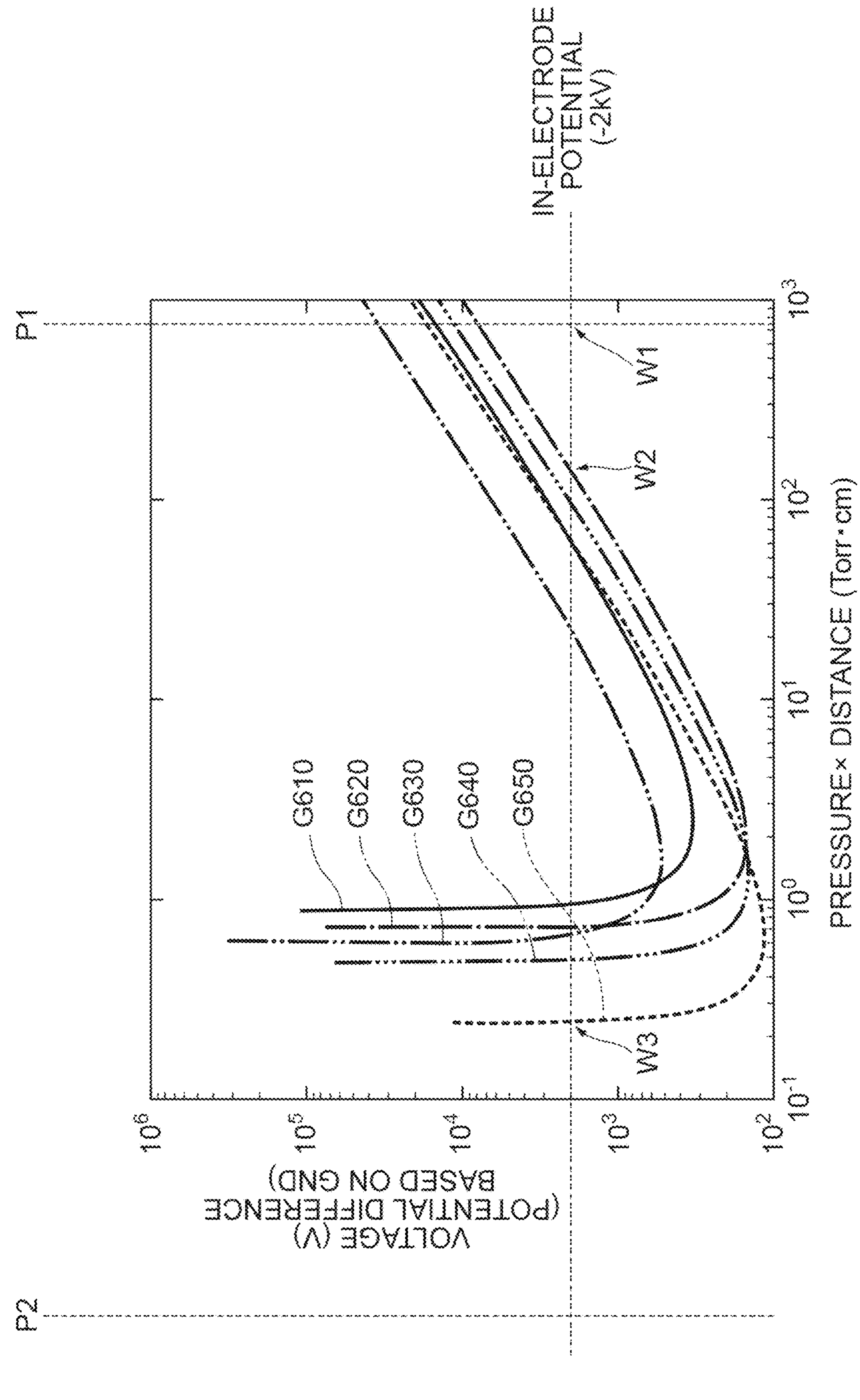
FIG. 6 is a graph illustrating the relationship (Paschen's law) between a distance between electrodes, the pressure in the vacuum chamber (degree of vacuum), and the discharge voltage.

FIG. 6 is a graph illustrating the relationship (Paschen's law) between the distance between the electrodes, the pressure (degree of vacuum) in the vacuum chamber, and the discharge voltage. The horizontal axis in FIG. 6 indicates a product of the pressure and the distance. Therefore, when the pressure is constant, the discharge distance can be determined. In FIG. 6, a graph G610 indicates a calculation result in a case where $H_2$ gas remains in the vacuum chamber, a graph G620 indicates a calculation result in a case where He gas remains in the vacuum chamber, a graph G630 indicates a calculation result in a case where $N_2$ gas remains in the vacuum chamber, a graph G640 indicates a calculation result in a case where Ne gas remains in the vacuum chamber, and a graph G650 indicates a measurement result in a case where Ar gas remains in the vacuum chamber. A region sandwiched at an acute angle by each of the graphs G610 to G650 is a discharge region. Note that the assumed configuration of the vacuum chamber is the same as the configuration illustrated in FIG. 5A.

(First condition)

The first condition is that the pressure in the vacuum chamber is set to atmospheric pressure and the input-side potential (IN-electrode potential) is set to −2 kV (absolute value 2 kV). The atmospheric pressure is $7.5\times10^2$ Torr ($1\times10^5$ Pa). In FIG. 6, when a line P1 is set to a line indicating the atmospheric pressure, an intersection W1 of the line P1 and a line indicating the IN-electrode potential is about 1 cm. That is, even in a state where various gases remain, discharge does not occur as long as the distance between the electrodes is about 1 cm. On the other hand, an intersection W2 indicates that the distance between the electrodes is 1 mm, and indicates that, when the distance between the electrodes is less than 1 mm, discharge occurs depending on the type of residual gas.

(Second Condition)

The second condition is that the pressure in the vacuum chamber is set to a general degree of vacuum (high degree of vacuum) for operating a conventional ion detector. The set degree of vacuum is $7.5\times10^{-7}$ Torr ($1\times10^{-4}$ Pa), and a line P2 illustrated in FIG. 6 is a line indicating a high degree of vacuum. Under this second condition, although an intersection W3 is unrealistic, it indicates that the distance between the electrodes at the limit at which discharge occurs is 10 kin.

(Third condition)

The third condition is that the pressure in the vacuum chamber is set to a low degree of vacuum. The set degree of vacuum is $7.5\times10^{-3}$ Torr (1 Pa), and the line P2 illustrated in FIG. 6 is a line indicating a low degree of vacuum. Under this third condition, the intersection W3 indicates that the distance between the electrodes at the limit at which discharge occurs is 30 cm.

Figure 7:
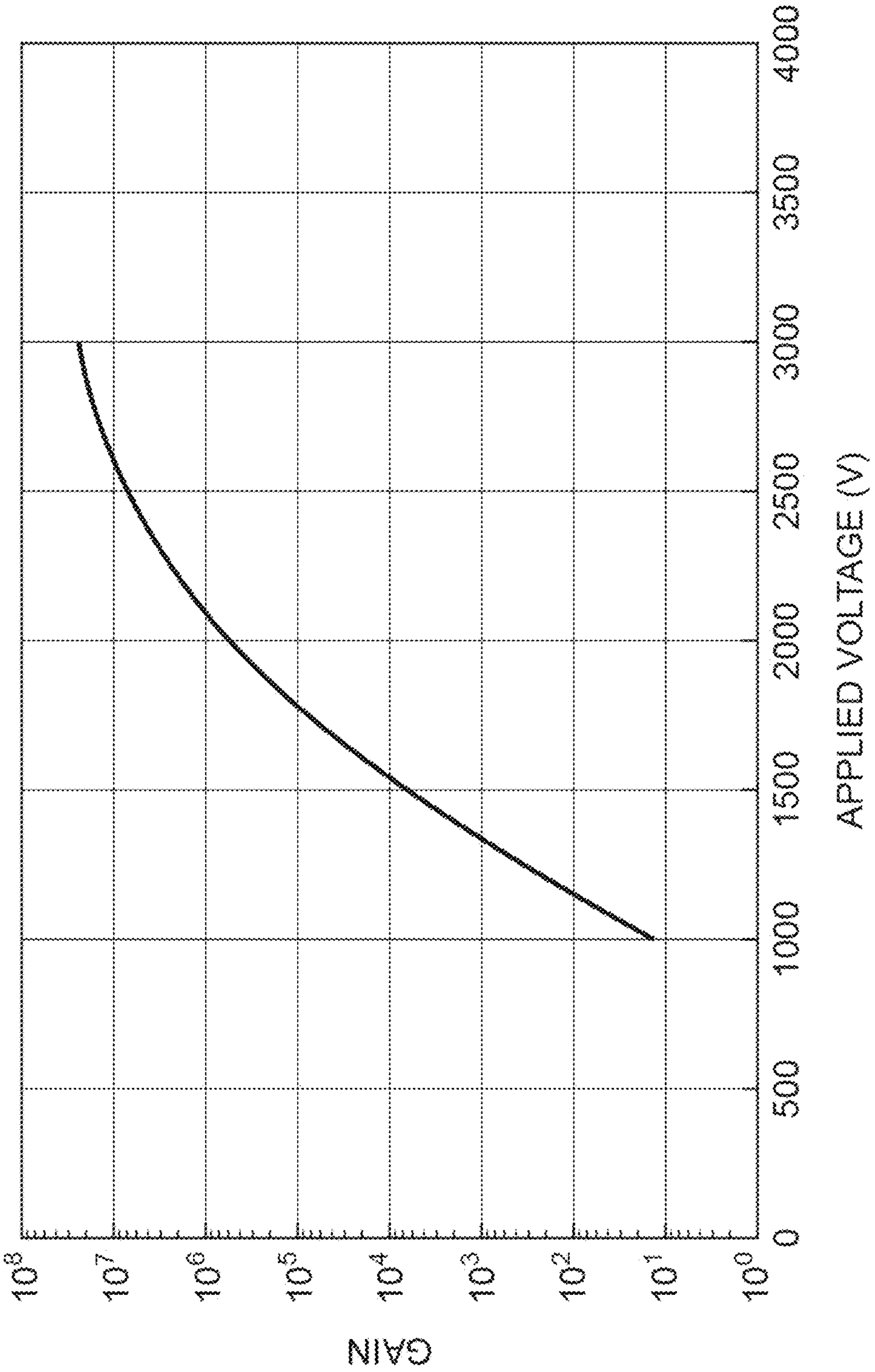
FIG. 7 is a graph illustrating the relationship between an applied voltage and a gain in a high vacuum state.

FIG. 7 illustrates the relationship between the applied voltage and the gain in the high vacuum state (0.0023 Pa). As can be seen from FIG. 7, in order to obtain a gain of about $10^6$, the potential of the input-side electrode needs to be set to 2100V (absolute value). As described above, at the potential (absolute value of the potential to which the input-side electrode is set) at which a sufficient gain is obtained in the high vacuum state, the operation result of the ion detector 200A according to the present embodiment illustrated in FIG. 2 is illustrated in FIGS. 8A and 8B.

Figure 8A:
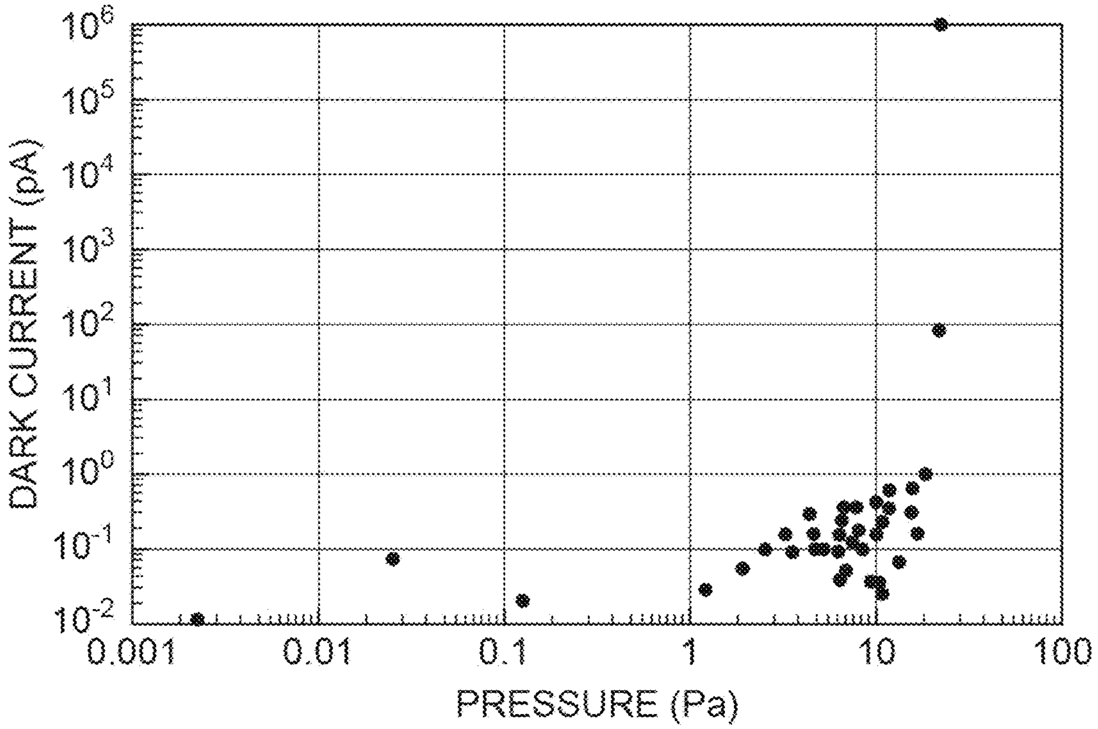
FIGS. 8A and 8B are graphs illustrating the relationship between the pressure in the vacuum chamber (degree of vacuum) and a dark current, and the relationship between the pressure in the vacuum chamber (degree of vacuum) and the gain.
Figure 8B:
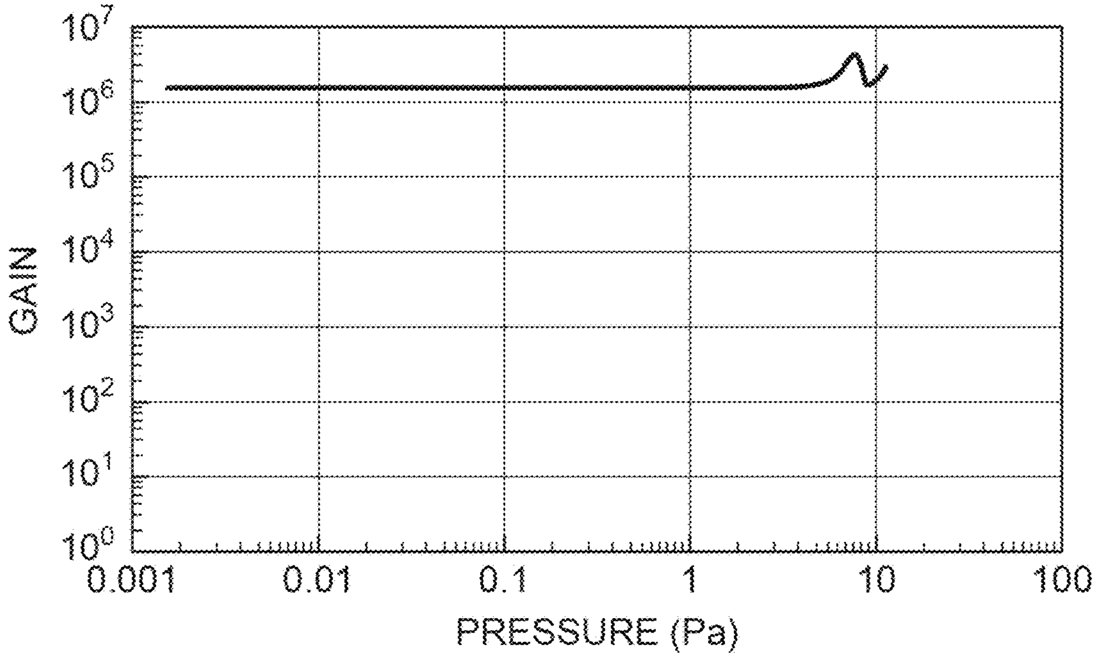

FIG. 8A is a graph illustrating the relationship between the pressure (degree of vacuum) in the vacuum chamber and a dark current, and FIG. 8B is a graph illustrating the relationship between the pressure (degree of vacuum) in the vacuum chamber and the gain. As can be seen from FIG. 8A, the dark current rapidly increased around when the pressure in the vacuum chamber exceeded 16 Pa, and discharge occurred at pressure of 17 Pa in the vacuum chamber. As can be seen from FIG. 8B, it was confirmed that a gain of about $10^6$ was obtained at pressure of up to about 10 Pa in the vacuum chamber (discharge occurred at 10.7 Pa). From these, according to the present embodiment, it has been demonstrated that sufficiently highly accurate ion detection is possible in a low vacuum state of up to about 10 Pa even when the pressure in the vacuum chamber is 1 Pa or more.

Next, various shield structures that can be used in the ion detector according to the present embodiment will be described with reference to FIGS. 9 to 11, 12A, 12B, and 13. The main parts (hereinafter simply referred to as "main part".) of the ion detector illustrated in FIGS. 9 to 11, 12A, 12B, and 13 are all unified in the structure illustrated in FIG. 4C.

Figure 9:
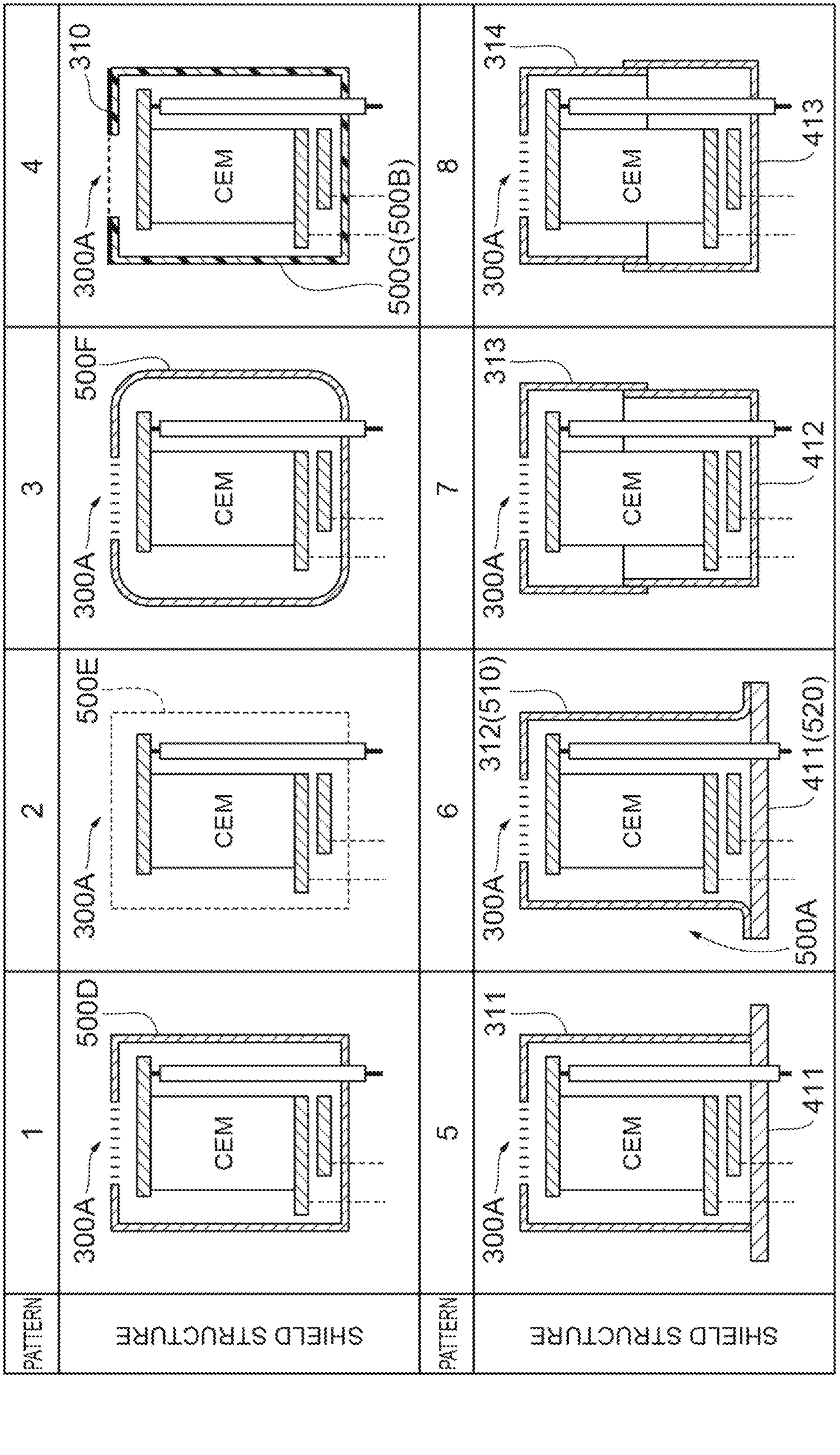
FIG. 9 is a diagram illustrating various shield structures that can be used in the ion detector according to the present embodiment (part 1).
Figure 10:
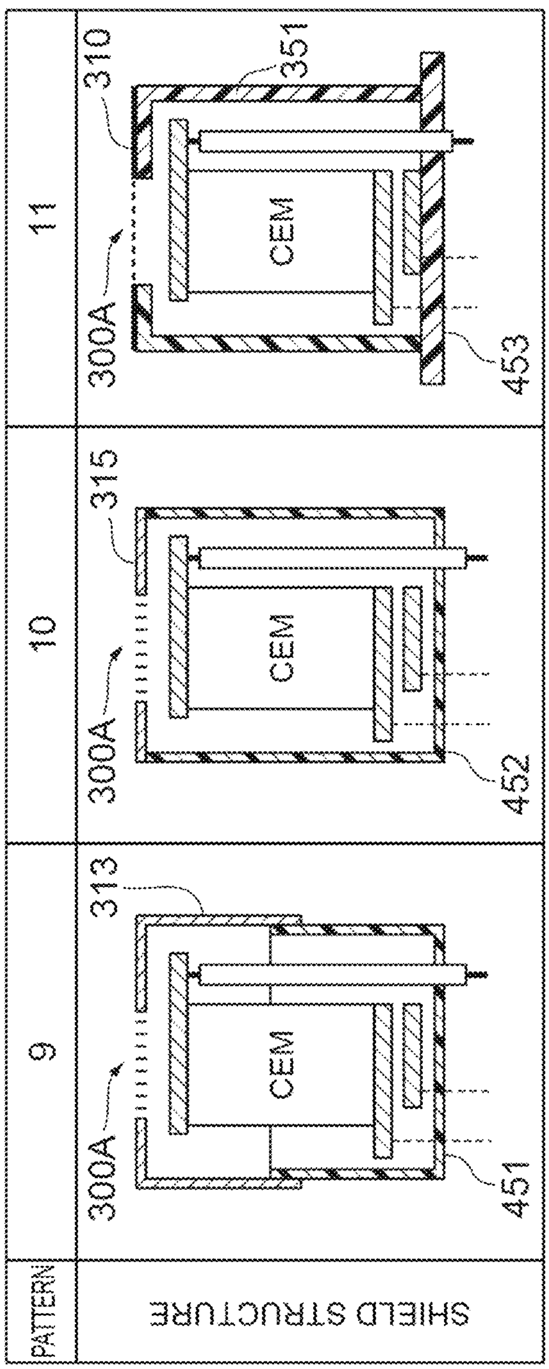
FIG. 10 is a diagram illustrating various shield structures that can be used in the ion detector according to the present embodiment (part 2).

Specifically, FIGS. 9 and 10 disclose various shield structures (patterns 1 to 11), each of which houses both the input-side electrode 220A and the output-side electrode 220B. Note that, in each of the shield structures illustrated in FIGS. 9 and 10, a separator (see FIG. 3A and the like) for limiting the movement of unnecessary ions generated in the shield structure may be provided between the input-side electrode and the output-side electrode.

In FIG. 9, the shield structure of pattern 1 is implemented as a shield structure 500D that houses the entire main part including the input-side electrode and the output-side electrode. The shield structure 500D includes one metal cover, and the metal cover has a mesh window 300A at a position facing the input unit of the CEM. The shield structure of pattern 2 is implemented as a shield structure 500E that houses the entire main part including the input-side electrode and the output-side electrode. The shield structure 500E includes one metal mesh, and a part of the metal mesh functions as the mesh window 300A. The shield structure of pattern 3 is implemented as a shield structure 500F. The shield structure 500F is substantially the same as the above-described shield structure 500D, but is different from the shield structure 500D in that it has a corner portion having a curvature. The shield structure of pattern 4 is implemented as a shield structure 500G that houses the entire main part including the input-side electrode and the output-side electrode. The shield structure 500G has substantially the same structure as the above-described shield structure 500B (FIG. 3B). That is, it includes an insulating cover comprised of an insulating material and a metal film 310 (or metal plate) having the mesh window 300A.

In addition, in FIG. 9, the shield structure of pattern 5 is implemented as a shield structure that houses the entire main part including the input-side electrode and the output-side electrode. The shield structure of pattern 5 includes a metal cover 311 that houses the entire main part and has a mesh window 300A, and a metal cover 411 that closes an opening of the metal cover 311. The shield structure of pattern 6 has substantially the same structure as the shield structure 500A illustrated in FIG. 3A. That is, the shield structure of pattern 6 includes a metal cover 312 that houses the entire main part and has a mesh window 300A, and a metal cover 411 that closes an opening of the metal cover 312. The shield structure of pattern 6 is different from the shield structure of pattern 5 in that the metal cover 312 has a flange. The shield structure of pattern 7 is implemented as a shield structure that houses the entire main part including the input-side electrode and the output-side electrode. The shield structure of pattern 7 includes a metal cover 313 that has a mesh window 300A and houses a part of the main part from the input-side electrode, and a metal cover 412 that houses a part of the main part from the output-side electrode. In the shield structure of pattern 7, an opening of the metal cover 412 is closed by the metal cover 313. The shield structure of pattern 8 is implemented as a shield structure that houses the entire main part including the input-side electrode and the output-side electrode. The shield structure of pattern 8 includes a metal cover 314 that has a mesh window 300A and houses a part of the main part from the input-side electrode, and a metal cover 413 that houses a part of the main part from the output-side electrode. In the shield structure of pattern 8, an opening of the metal cover 314 is closed by the metal cover 413.

In FIG. 10, the shield structure of pattern 9 is implemented as a shield structure that houses the entire main part including the input-side electrode and the output-side electrode. The shield structure of pattern 9 includes a metal cover 313 that has a mesh window 300A and houses a part of the main part from the input-side electrode, and an insulating cover 451 that houses a part of the main part from the output-side electrode. In the shield structure of pattern 9, an opening of the insulating cover 451 is closed by the metal cover 313. Note that, instead of the metal cover 313, an insulating cover having an opening in which the mesh window 300A is disposed may be used. The shield structure of pattern 10 is implemented as a shield structure that houses the entire main part including the input-side electrode and the output-side electrode. The shield structure of pattern 10 includes an insulating cover 452 that houses the entire main part from the output-side electrode side, and a metal plate 315 having a mesh window 300A. In the shield structure of pattern 10, an opening of the insulating cover 452 is closed by the metal plate 315. The shield structure of pattern 11 is implemented as a shield structure that houses the entire main part including the input-side electrode and the output-side electrode. The shield structure of pattern 11 includes an insulating cover 351 that houses the entire main part from the input-side electrode, a metal film 310 having a mesh window 300A, and an insulating cover 453. In the shield structure of pattern 11, the metal film 310 is disposed so as to cover one of two openings of the insulating cover 351 with the mesh window 300A, and the one of the two openings is closer to the input-side electrode. The other opening of the insulating cover 351 is closed by the insulating cover 453.

Figure 11:
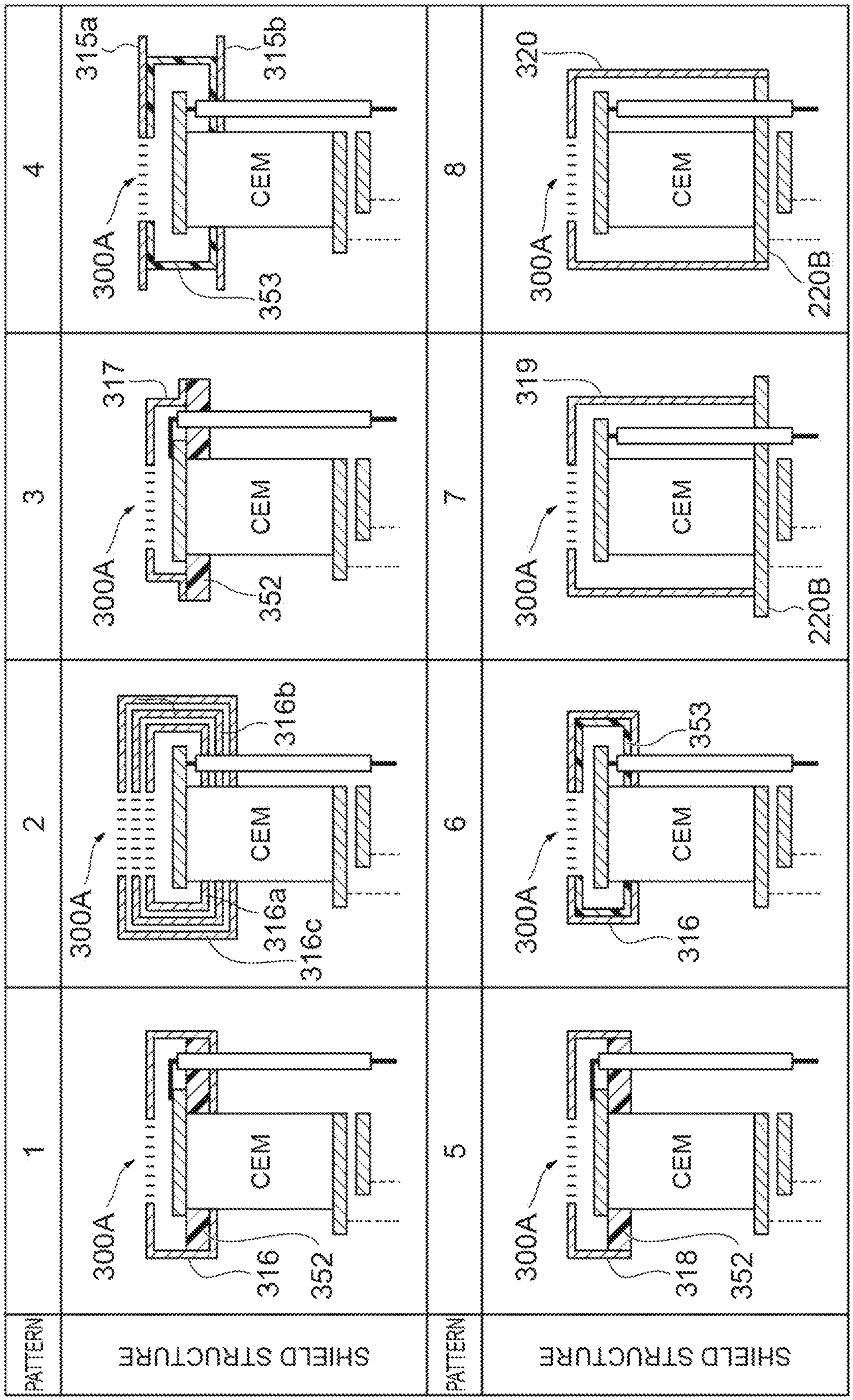
FIG. 11 is a diagram illustrating various shield structures that can be used in the ion detector according to the present embodiment (part 3).
Figure 12A:
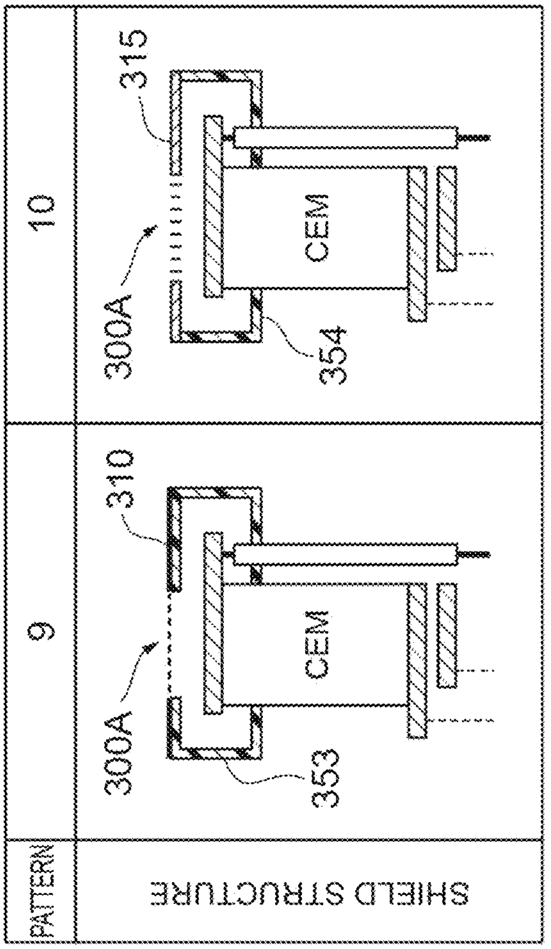
FIGS. 12A and 12B are diagrams illustrating various shield structures that can be used in the ion detector according to the present embodiment (part 4).

FIGS. 11 and 12A disclose various shield structures (patterns 1 to 10), each of which houses the input-side electrode 220A.

In FIG. 11, the shield structure of pattern 1 is implemented as a shield structure that houses a part of the main part including the input-side electrode. The shield structure of pattern 1 includes an insulating plate 352 disposed to support the input-side electrode, and a metal cover 316 that houses both the input-side electrode and the insulating plate 352. In this case, the insulating plate 352 is provided to hold the metal cover 316. The mesh window 300A is provided in the metal cover 316. The shield structure of pattern 2 is implemented as a shield structure that houses a part of the main part including the input-side electrode. The shield structure of pattern 2 includes a plurality of metal covers 316*a* to 316*c* each having a mesh structure. The potentials of the metal covers 316*a* to 316*c* preferably form a potential gradient having a potential difference (for example, 400V) to such an extent that no discharge occurs between the covers. The mesh structure of the metal covers 316*a* to 316*c* constitutes the mesh window 300A. In the shield structure of pattern 2, the metal cover 316*a* is housed in the metal cover 316*b*, and both the metal covers 316*a* and 316*b* are housed in the metal cover 316*c*. The shield structure of pattern 3 is implemented as a shield structure that houses a part of the main part including the input-side electrode. The shield structure of pattern 3 includes an insulating plate 352 disposed to support the input-side electrode, and a metal cover 317 housing the input-side electrode and fixed to the insulating plate 352. Also, in this pattern 3, the insulating plate 352 is provided to hold the metal cover 317. The mesh window 300A is provided in the metal cover 317. The metal cover 317 is provided with a flange to facilitate fixing to the insulating plate 352. The shield structure of pattern 4 is implemented as a shield structure that houses a part of the main part including the input-side electrode. The shield structure of pattern 4 includes an insulating cover 353 that houses a part of the main part including the input-side electrode, and metal plates 315*a* and 315*b* disposed so as to pinch the insulating cover 353. The mesh window 300A is provided on the one metal plate 315*a*.

In addition, in FIG. 11, the shield structure of pattern 5 is implemented as a shield structure that houses a part of the main part including the input-side electrode. The shield structure of pattern 5 includes an insulating plate 352 disposed to support the input-side electrode, and a metal cover 318 housing the input-side electrode and fixed to the insulating plate 352. The mesh window 300A is provided in the metal cover 318. In the shield structure of pattern 5, the insulating plate 352 functions to hold the metal cover 318. However, the shield structure of pattern 5 is different from the shield structure of pattern 1 in that the insulating plate is not housed in the metal cover 318. The shield structure of pattern 6 is implemented as a shield structure that houses a part of the main part including the input-side electrode. The shield structure of pattern 6 includes an insulating cover 353 that houses the input-side electrode, and a metal cover 316 (the same as pattern 1) that houses both the input-side electrode and the insulating cover 353. The metal cover 316 has a mesh window 300A, and the mesh window 300A is disposed so as to cover an opening of the insulating cover 353. The insulating cover 353 may be an insulating film coated on an inner wall surface of the metal cover 316. The shield structure of pattern 7 is implemented as a shield structure that houses a part of the main part including the input-side electrode, and a part of the shield structure includes the output-side electrode. The shield structure of pattern 7 includes a metal cover 319 that houses the input-side electrode, and the output-side electrode. The metal cover 319 has a mesh window 300A, and an opening is fixed to the output-side electrode. The shield structure of pattern 8 is implemented as a shield structure that houses a part of the main part including the input-side electrode, and is fixed to the output-side electrode itself. The shield structure of pattern 8 includes a metal cover 320 that is fixed to the output-side electrode and houses the input-side electrode. The metal cover 320 has a mesh window 300A, and an opening is fixed to the output-side electrode.

In FIG. 12A, the shield structure of pattern 9 is implemented as a shield structure that houses a part of the main part including the input-side electrode. The shield structure of pattern 9 includes an insulating cover 353 (the same as pattern 6) that houses the input-side electrode, and a metal film 310 having a mesh window 300A. The metal film 310 is fixed to the insulating cover 353 such that an opening of the insulating cover 353 is covered with the mesh window 300A. An outer peripheral surface of the insulating cover 353 may be coated with a conductive film in order to prevent leakage of the potential gradient formed by the input-side electrode. The shield structure of pattern 10 is implemented as a shield structure that houses a part of the main part including the input-side electrode. The shield structure of pattern 10 includes an insulating cover 354 that houses the input-side electrode, and a metal plate 315 (the same as pattern 10 illustrated in FIG. 10) having a mesh window 300A. The metal plate 315 is disposed so as to cover an opening of the insulating cover 354. An outer peripheral surface of the insulating cover 354 may be coated with a conductive film in order to prevent leakage of the potential gradient formed by the input-side electrode.

Figure 12B:
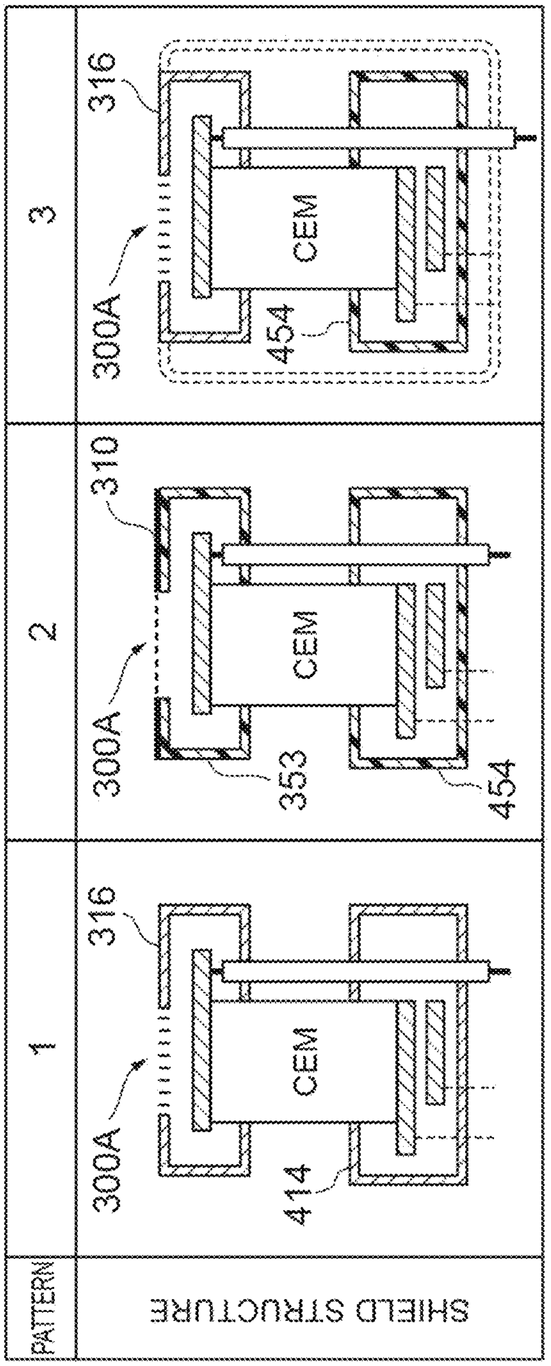

FIG. 12B illustrates various shield structures (patterns 1 to 3) formed such that an input-side shield portion (corresponding to the input-side shield portion 300 illustrated in FIG. 2) that houses the input-side electrode 220A and an output-side shield portion (corresponding to the output-side shield portion 400 illustrated in FIG. 2) that houses the output-side electrode 220B are physically separated from each other.

In FIG. 12B, the shield structure of pattern 1 is implemented as an input-side shield portion that houses a part of the main part together with the input-side electrode, and an output-side shield portion that houses a part of the main part together with the output-side electrode. In the shield structure of pattern 1, the input-side shield portion includes a metal cover 316 (the same as pattern 6 illustrated in FIG. 11) that houses the input-side electrode, and a mesh window 300A is provided in the metal cover 316. The output-side shield portion includes a metal cover 414 that houses the output-side electrode, and the metal cover 414 and the metal cover 316 are physically and electrically separated from each other. The shield structure of pattern 2 is implemented as an input-side shield portion that houses a part of the main part together with the input-side electrode, and an output-side shield portion that houses a part of the main part together with the output-side electrode. In the shield structure of pattern 2, the input-side shield portion includes an insulating cover 353 (the same as pattern 10 illustrated FIG. 12A) that houses the input-side electrode, and a metal film 310 having a mesh window 300A. The metal film 310 is fixed to the insulating cover 353 such that the mesh window 300A closes an opening of the insulating cover 353. The output-side shield portion includes an insulating cover 454 that houses the output-side electrode. The shield structure of pattern 3 is implemented as an input-side shield portion that houses a part of the main part together with the input-side electrode, and an output-side shield portion that houses a part of the main part together with the output-side electrode. In the shield structure of pattern 3, the input-side shield portion includes a metal cover 316 (the same as pattern 6 illustrated in FIG. 11) that houses the input-side electrode, and a mesh window 300A is provided in the metal cover 316. The output-side shield portion includes an insulating cover 454 (the same as pattern 2) that houses the output-side electrode. Note that, as indicated by a broken line, the metal cover 316 may have a structure that also houses the output-side shield portion together with the input-side electrode.

Figure 13:
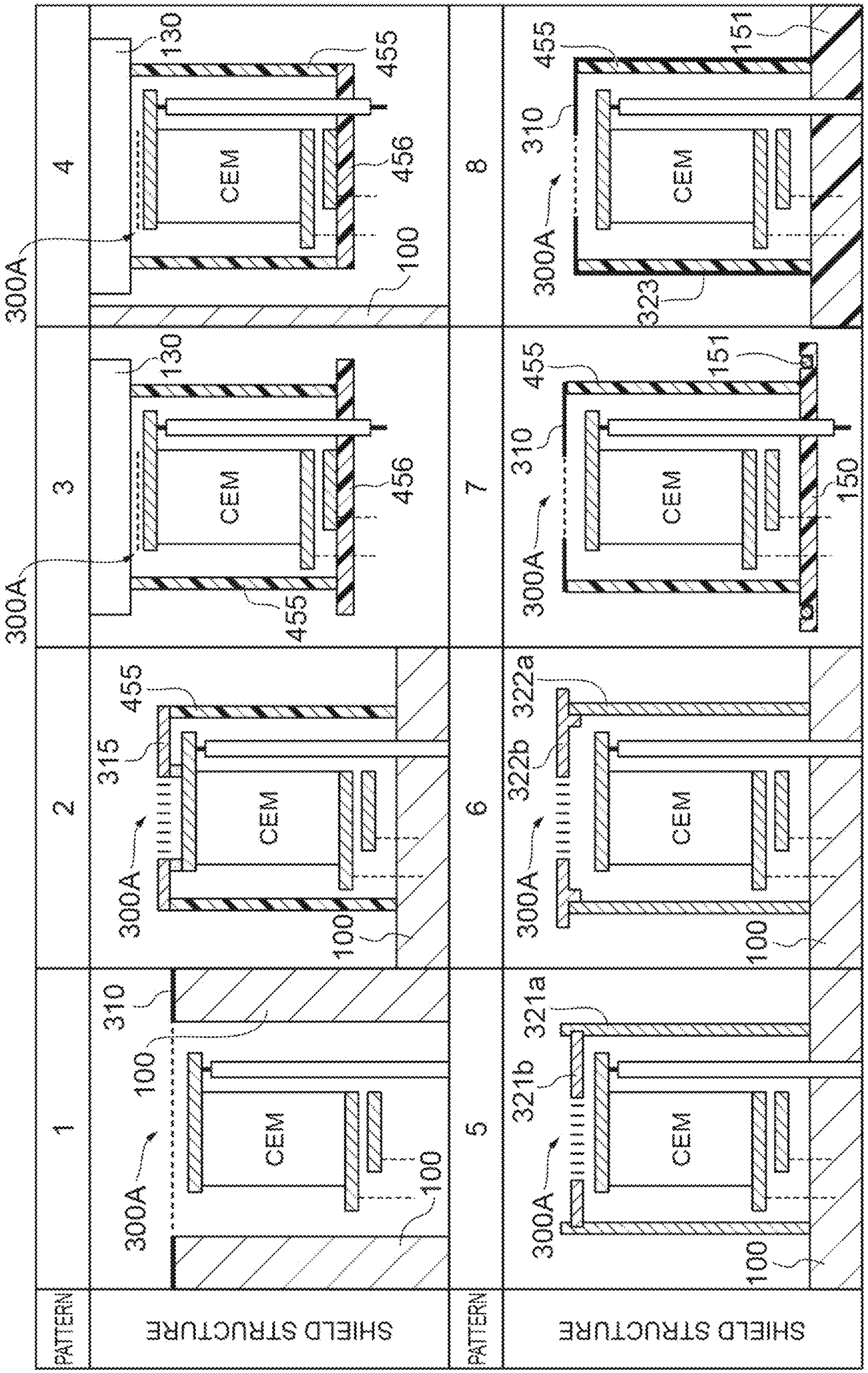
FIG. 13 is a diagram illustrating various shield structures that can be used in the ion detector according to the present embodiment (part 5).

FIG. 13 illustrates various shield structures (patterns 1 to 8) in which a part of a housing of a device housing the ion detector is used. Note that, in each shield structure illustrated in FIG. 13, a separator (see FIG. 3A and the like) may be provided between the input-side electrode and the output-side electrode for discharge countermeasures.

In FIG. 13, the shield structure of pattern 1 is implemented as a shield structure that houses the entire main part including the input-side electrode and the output-side electrode, and a part of the shield structure is constituted by a part of a housing (for example, a part of the housing 100 illustrated in FIG. 1) in a device that houses the ion detector according to the present embodiment. The shield structure of pattern 1 includes a recess (depressed portion) (in which the entire main part is housed) provided in the housing 100. The metal film 310 having the mesh window 300A is disposed so as to close an opening of the recess provided in the housing 100. The housing 100 is set to the ground potential (−500V to +500V). The shield structure of pattern 2 is implemented as a shield structure that houses the entire main part including the input-side electrode and the output-side electrode, and a part of the shield structure is constituted by a part of the housing in the device that houses the ion detector according to the present embodiment. The shield structure of pattern 2 includes the part of the housing 100, an insulating cover 455 fixed to the part of the housing, and a metal plate 315 having a mesh window 300A (the same as pattern 10 illustrated in FIG. 10). The metal plate 315 having the mesh window 300A is fixed to one opening of the insulating cover 455, and the other opening of the insulating cover 455 is closed by the part of the housing 100. The shield structure of pattern 3 is implemented as a shield structure that houses the entire main part including the input-side electrode and the output-side electrode, and a part of the shield structure is constituted by a separation unit 130 in the device that houses the ion detector according to the present embodiment. The shield structure of pattern 3 includes an insulating cover 455 (the same as pattern 2) fixed to the separation unit 130, a printed wiring board 456 on which an anode is disposed, and a mesh window 300A. One opening of the insulating cover 455 is fixed to the separation unit 130, and the mesh window 300A is disposed between the separation unit 130 and the input-side electrode. The other opening of insulating cover 455 is closed by the printed wiring board 456. The shield structure of pattern 4 is implemented as a shield structure that houses the entire main part including the input-side electrode and the output-side electrode, and a part of the shield structure is constituted by a separation unit 130 in the device that houses the ion detector according to the present embodiment. The shield structure of pattern 4 is substantially the same as pattern 3 described above, but is different from pattern 3 in that the shield structure is disposed in the vicinity of the housing 100 set to the ground potential.

In addition, in FIG. 13, the shield structure of pattern 5 is implemented as a shield structure that houses the entire main part including the input-side electrode and the output-side electrode, and a part of the shield structure is constituted by a part of the housing in the device that houses the ion detector according to the present embodiment. The shield structure of pattern 5 includes the part of the housing 100, a metal cover 321*a* fixed to the part of the housing, and a metal plate 321*b* having a mesh window 300A. In the vicinity of one opening of the metal cover 321*a*, the metal cover 321*a* holds the metal plate 321*b* while housing the metal plate 321*b*. The other opening of the metal cover 321*a* is closed by the part of the housing 100. The shield structure of pattern 6 is implemented as a shield structure that houses the entire main part including the input-side electrode and the output-side electrode, and a part of the shield structure is constituted by a part of the housing in the device that houses the ion detector according to the present embodiment. The shield structure of pattern 6 includes the part of the housing 100, a metal cover 322*a* fixed to the part of the housing, and a metal plate 322*b* having a mesh window 300A. The metal plate 322*b* is fitted in one opening of the metal cover 322*a*. The other opening of the metal cover 322*a* is closed by the part of the housing 100. The shield structure of pattern 7 is implemented as a shield structure that houses the entire main part including the input-side electrode and the output-side electrode, and a part of the ion detector has a flange comprised of an insulating material. Note that a part of the shield structure may be constituted by a part of the housing (comprised of an insulating material) in the device that houses the ion detector according to the present embodiment. The shield structure of pattern 7 includes a part of the insulating plate 150 with a flange, an insulating cover 455 (the same as pattern 2) fixed to the part of the insulating plate 150, and a metal film 310 having a mesh window 300A. One opening of the insulating cover 455 is covered with the metal film 310 having the mesh window 300A. The other opening of the insulating cover 455 is closed by the part of the insulating plate 150 in which an O-ring 151 is disposed. The shield structure of pattern 8 is implemented as a shield structure that houses the entire main part including the input-side electrode and the output-side electrode, and a part of the shield structure is constituted by a part of the housing in the device that houses the ion detector according to the present embodiment. In this pattern 8, the housing is comprised of an insulating material. The shield structure of pattern 8 includes a part 151 of the insulating housing (substantially the same as the insulating plate 150), an insulating cover 455 (the same as pattern 2) fixed to the part 151 of the insulating housing, a metal film 310 having a mesh window 300A, and a conductive layer 323 provided on an outer peripheral surface of the insulating cover 455. One opening of the insulating cover 455 is covered with the metal film 310 having the mesh window 300A. The other opening of the insulating cover 455 is closed by the part 151 of the insulating housing. The outer peripheral surface of the insulating cover 455 is coated with the conductive layer 323 in order to block electromagnetic noise.

From the above description of the present invention, it is apparent that the present invention can be variously modified. Such modifications cannot be regarded as departing from the spirit and scope of the present invention, and improvements obvious to all those skilled in the art are included in the following claims.

REFERENCE SIGNS LIST

1 . . . Mass spectrometer (measuring device); 200A, 200B, 200C . . . Ion detector; 210A . . . CEM (electron multiplier); 210B . . . Dynode unit (electron multiplier); 220A . . . Input-side electrode; 220B . . . Output-side electrode; 300A . . . Mesh window; 300 . . . Input-side shield portion; 400 . . . Output-side shield portion; 500A, 500B, 500D to 500G . . . Shield structure; 610*a* . . . Input-side cable; 610*c* . . . Output-side cable; and 620 . . . Resin coating.

The invention claimed is:

1. An ion detector provided in a housing in a depressurized state, the ion detector comprising:

an electron multiplier including an input and an output;

an input-side electrode having at least a portion provided in the input of the electron multiplier;

an output-side electrode having at least a portion provided in the output of the electron multiplier;

a shield structure comprising a cover connected to a stem plate, the cover surrounding the input-side electrode, the output-side electrode, and the electron multiplier, the shield structure being comprised of a metal material or a metal material and an insulating material;

a mesh window constituting a part of the shield structure and comprised of the metal material and facing the input of the electron multiplier, the cover extending from the mesh window to the stem plate;

an input-side cable penetrating the housing and having one end electrically connected to the input-side electrode; and a first insulating coating provided on an outer peripheral surface of the input-side cable and extending along a longitudinal direction of the input-side cable, the first insulating coating including a portion that is in direct contact with an inner wall of the housing and extends from the inner wall of the housing toward the input-side electrode.

2. The ion detector according to claim 1, wherein the shield structure is disposed in the housing while being physically separated from the housing, and the part of the first insulating coating covers at least an entire exposed region present on the outer peripheral surface of the input-side cable and extending from the inner wall of the housing to the shield structure.

3. The ion detector according to claim 1, wherein the first insulating coating is comprised of a resin material.

4. The ion detector according to claim 1, wherein the shield structure includes a separator comprised of an insulating material and disposed between the input-side electrode and the output-side electrode.

5. The ion detector according to claim 1, further comprising:

an output-side cable penetrating the housing and having one end electrically connected to the output-side electrode; and a second insulating coating provided on an outer peripheral surface of the output-side cable and extending along a longitudinal direction of the output-side cable, the second insulating coating including a portion that is in direct contact with the inner wall of the housing and extends from the inner wall of the housing toward the output-side electrode.

6. The ion detector according to claim 5, wherein the second insulating coating is comprised of a resin material.

7. The ion detector according to claim 1, wherein the mesh window is set to a ground potential.

8. The ion detector according to claim 1, wherein a shortest distance from the input-side electrode to a member included in the shield structure and comprised of the metal material is 1 cm or less.

9. A measuring device comprising:

the ion detector as defined in claim 1; and a housing in which at least the ion detector is provided, the housing including one or more members, each of the one or more members being comprised of a metal material or an insulating material.

10. A measuring device comprising:

a housing including one or more members, each of the one or more members being comprised of a metal material or an insulating material;

an ion detector provided in the housing, the ion detector including an electron multiplier having an input and an output, an input-side electrode having at least a portion provided in the input of the electron multiplier, and an output-side electrode having at least a portion provided in the output of the electron multiplier;

an input-side cable penetrating the housing and having one end electrically connected to the input-side electrode;

a first insulating coating provided on an outer peripheral surface of the input-side cable and extending along a longitudinal direction of the input-side cable, the first insulating coating including a portion that is in direct contact with an inner wall of the housing and extends from the inner wall of the housing toward the input-side electrode; and a shield structure provided in the housing, the shield structure comprising a cover connected to a stem plate, the cover surrounding the input-side electrode, the output-side electrode, and the electron multiplier, the shield structure comprised of a metal material or a metal material and an insulating material, and the shield structure includes a mesh window that constitutes a part of the shield structure and comprised of the metal material and faces the input of the electron multiplier, the cover extending from the mesh window to the stem plate, and at least a part of the shield structure is constituted by the housing.

11. A mass spectrometer comprising:

an ionizer;

a separator provided on an output-side of the ionizer;

the ion detector as defined in claim 1, the mesh window of the ion detector being positioned between the separator and the input-side electrode; and a housing in which least the ionizer, the separator, and the ion detector are provided.

12. A mass spectrometer comprising:

an ionizer;

a separator provided on an output-side of the ionizer;

an ion detector including an electron multiplier having an input and an output, an input-side electrode having at least a portion provided in the input of the electron multiplier, and an output-side electrode having at least a portion provided in the output of the electron multiplier;

a shield structure comprising a cover connected to a stem plate, the cover surrounding the input-side electrode, the output-side electrode, and the electron multiplier; and a housing in which at least the ionizer, the separator, the ion detector, and the shield structure are provided;

an input-side cable penetrating the housing and having one end electrically connected to the input-side electrode; and a first insulating coating provided on an outer peripheral surface of the input-side cable and extending along a longitudinal direction of the input-side cable, the first insulating coating including a portion that is in direct contact with an inner wall of the housing and extends from the inner wall of the housing toward the input-side electrode, wherein the shield structure being comprised of a metal material or a metal material and an insulating material, the shield structure includes a mesh window that constitutes a part of the shield structure and comprised of the metal material and faces the input of the electron multiplier, the cover extending from the mesh window to the stem plate, and at least a part of the shield structure is constituted by the housing.

* * * * *